US012675668B2

(12) United States Patent
Ganju et al.

(10) Patent No.: US 12,675,668 B2
(45) Date of Patent: Jul. 7, 2026

(54) COMPONENT, ASSEMBLY, AND USAGE PERSPICACITY MODEL AND USES THEREOF

(71) Applicant: Mellanox Technologies, Ltd., Yokneam (IL)

(72) Inventors: Siddha Ganju, Santa Clara, CA (US); Elad Mentovich, Tel Aviv (IL); Yaakov Gridish, Yoqneam Ilit (IL)

(73) Assignee: Mellanox Technologies, Ltd., Yokneam (IL)

( * ) Notice: Subject to any disclaimer, the term of this patent is extended or adjusted under 35 U.S.C. 154(b) by 977 days.

(21) Appl. No.: 17/807,444

(22) Filed: Jun. 17, 2022

(65) Prior Publication Data

US 2023/0409016 A1     Dec. 21, 2023

(51) Int. Cl.
*G06F 7/48* (2006.01)
*G06F 18/2337* (2023.01)
*G06N 3/043* (2023.01)
*G06N 3/045* (2023.01)

(52) U.S. Cl.
CPC ......... *G06N 3/043* (2023.01); *G06F 18/2337* (2023.01); *G06N 3/045* (2023.01)

(58) Field of Classification Search
CPC .... G06N 3/043; G06N 3/045; G06F 18/2337; G05B 2219/32193; G05B 2219/32194; G05B 19/41875
See application file for complete search history.

(56) References Cited

U.S. PATENT DOCUMENTS

2014/0075004 A1*   3/2014   Van Dusen ............ G06Q 10/10
                                               709/223
2022/0092492 A1*   3/2022   Silverstein ............... G06N 3/08

OTHER PUBLICATIONS

Yan, Jihong, Chunhua Feng, and Kai Cheng. "Sustainability-oriented product modular design using kernel-based fuzzy c-means clustering and genetic algorithm." Proceedings of the Institution of Mechanical Engineers, Part B: Journal of Engineering Manufacture 226.10 (2012): 1635-1647. (Year: 2012).*

(Continued)

*Primary Examiner* — Nithya J. Moll
(74) *Attorney, Agent, or Firm* — Alston & Bird LLP

(57) ABSTRACT

A computing entity obtains product information corresponding to a product and defines a multi-region metric space vector based on the product information. The multi-region metric space vector is a vector within a multi-region metric space that comprises a first region corresponding to supply chain/component information, a second region corresponding to assembly/fabrication information, and a third region corresponding to usage/usage environment information. Each of the first, second, and third regions are multi-dimensional. The computing entity processes the multi-region metric space vector using a component, assembly, and usage perspicacity model configured to define fuzzy clusters within the multi-region metric space; determines a parameter corresponding to the product based on at least one fuzzy cluster to which the perspicacity model assigned the multi-region space vector; and provides or causes providing of (a) a visual/audible representation of the parameter or (b) a machine-readable representation of the parameter as input to an application/program.

20 Claims, 6 Drawing Sheets

(56)     References Cited

OTHER PUBLICATIONS

Paul, Sayak et al. "Flood Segmentation On Sentinel-1 SAR Imagery With Semi-Supervised Learning," arXiv Preprint arXiv: 2107. 08369v4 [cs.CV] Oct. 25, 2021, pp. 1-12 pages. Available online at: <URL: https://arxiv.org/pdf/2107.08369.pdf>.

* cited by examiner

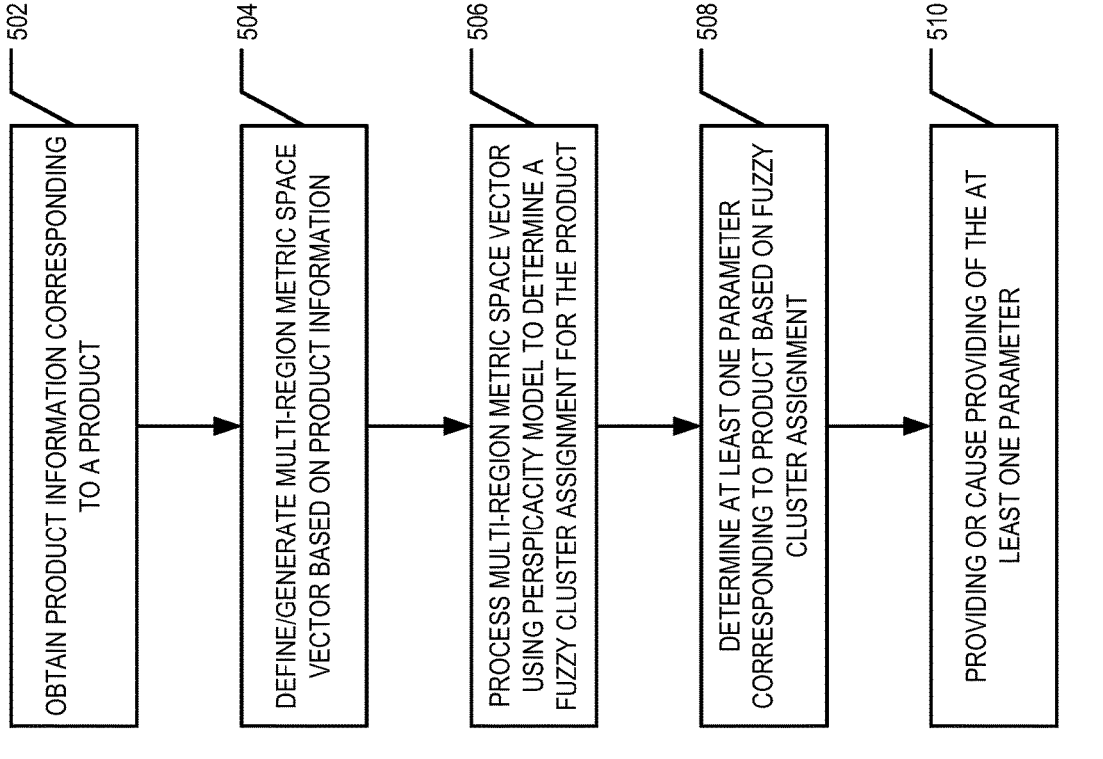

502 — OBTAIN PRODUCT INFORMATION CORRESPONDING TO A PRODUCT

504 — DEFINE/GENERATE MULTI-REGION METRIC SPACE VECTOR BASED ON PRODUCT INFORMATION

506 — PROCESS MULTI-REGION METRIC SPACE VECTOR USING PERSPICACITY MODEL TO DETERMINE A FUZZY CLUSTER ASSIGNMENT FOR THE PRODUCT

508 — DETERMINE AT LEAST ONE PARAMETER CORRESPONDING TO PRODUCT BASED ON FUZZY CLUSTER ASSIGNMENT

510 — PROVIDING OR CAUSE PROVIDING OF THE AT LEAST ONE PARAMETER

FIG. 5

COMPONENT, ASSEMBLY, AND USAGE PERSPICACITY MODEL AND USES THEREOF

TECHNICAL FIELD

Various embodiments of the present disclosure address technical challenges related to traceability and visibility related to various aspects of a product. Various embodiments of the present disclosure relate to a perspicacity model and some example uses thereof that provide technical solutions to such technical challenges.

BACKGROUND

In various manufacturing and product fabrication facilities, visual inspection is used to identify products that are expected to fail or not function properly. However, due to the limitations of human vision, a number of products that should be flagged for further review may be missed. Additionally, various details regarding a product that are important for the performance of the product in various usage environments may not be evident in a visual inspection.

BRIEF SUMMARY

Various embodiments provide methods, apparatus, systems, computing devices, computing entities, and/or the like for providing perspicacity of the supply chain, components, assembly and/or fabrication, usage and usage environment of various products and making use of the provided perspicacity to improve product performance, to design products that exhibit improved performance and/or the like. In various embodiments, a perspicacity model is trained using a machine learning technique. In various embodiments, the training of the perspicacity model comprises generating pseudo-labels for one or more data sets and training the perspicacity model using the one or more data sets and the corresponding pseudo-labels. In various embodiments, the perspicacity model is configured to generate and/or define fuzzy clusters in a multi-region metric space. A product may be assigned to one or more fuzzy clusters based on the results of analyzing and/or processing product information corresponding to the product using the perspicacity model. Based on the one or more fuzzy clusters a product is assigned to, various insights regarding the product may be gleaned and used to improve the performance of the product itself (e.g., identifying a usage environment in which the product is expected to perform more effectively), design products that offer improved performance, and/or the like.

In accordance with one aspect, a method for providing component/supply chain, assembly/fabrication, and usage/usage environment perspicacity for one or more products is provided. In various embodiments, the method is performed by a computing entity. In an example embodiment, the method comprises obtaining product information corresponding to a product; and defining a multi-region metric space vector based at least in part on the product information. The multi-region metric space vector is a vector within a multi-region metric space. The multi-region metric space comprises a first region corresponding to supply chain and component information, a second region corresponding to assembly and fabrication information, and a third region corresponding to usage and usage environment information. At least the first region, second region, and third region of the multi-region metric space are each multi-dimensional regions. The method further comprises processing the multi-region metric space vector using an at least partially trained perspicacity model configured to define fuzzy clusters within the multi-region metric space; determining at least one parameter corresponding to the product based at least in part on at least one fuzzy cluster to which the perspicacity model assigned the multi-region space vector; and providing or causing providing of (a) a visual or audible representation of the at least one parameter or (b) a machine-readable representation of the at least one parameter as input to an application or program being operated on one or more processors.

In accordance with another aspect, a computer program product configured to provide component/supply chain, assembly/fabrication, and usage/usage environment perspicacity for one or more products is provided. The computer program product may comprise at least one non-transitory computer-readable storage medium having computer-readable program code portions stored therein. The computer-readable program code portions comprise executable portions configured to, when executed by one or more processors, cause the one or more processors to obtain product information corresponding to a product; and define a multi-region metric space vector based at least in part on the product information. The multi-region metric space vector is a vector within a multi-region metric space. The multi-region metric space comprises a first region corresponding to supply chain and component information, a second region corresponding to assembly and fabrication information, and a third region corresponding to usage and usage environment information. At least the first region, second region, and third region of the multi-region metric space are each multi-dimensional regions. The computer-readable program code portions comprise executable portions further configured to, when executed by one or more processors, cause the one or more processors to process the multi-region metric space vector using an at least partially trained perspicacity model configured to define fuzzy clusters within the multi-region metric space; determine at least one parameter corresponding to the product based at least in part on at least one fuzzy cluster to which the perspicacity model assigned the multi-region space vector; and provide or cause providing of (a) a visual or audible representation of the at least one parameter or (b) a machine-readable representation of the at least one parameter as input to an application or program being operated on one or more processors.

In accordance with yet another aspect, an apparatus (e.g., a computing entity) comprising at least one processor and at least one memory including computer program code is provided. In one embodiment, the at least one memory and the computer program code are configured to, with the at least one processor, cause the apparatus to at least obtain product information corresponding to a product; and define a multi-region metric space vector based at least in part on the product information. The multi-region metric space vector is a vector within a multi-region metric space. The multi-region metric space comprises a first region corresponding to supply chain and component information, a second region corresponding to assembly and fabrication information, and a third region corresponding to usage and usage environment information. At least the first region, second region, and third region of the multi-region metric space are each multi-dimensional regions. The at least one memory and the computer program code are further configured to, with the at least one processor, cause the apparatus to at least process the multi-region metric space vector using an at least partially trained perspicacity model configured to define fuzzy clusters within the multi-region metric space; determine at least one parameter corresponding to the product based at least in part on at least one fuzzy cluster to which the perspicacity model assigned the multi-region space vector; and provide or cause providing of (a) a visual or audible representation of the at least one parameter or (b) a machine-readable representation of the at least one parameter as input to an application or program being operated on one or more processors.

In accordance with another aspect of the present invention, a method for providing perspicacity regarding an item is provided. In an example embodiment, the method is performed by a computing entity and comprises obtaining item information corresponding to an item; and defining a multi-region metric space vector based at least in part on the item information. The multi-region metric space vector is a vector within a multi-region metric space that comprises a first region corresponding to a first portion of the item information corresponding to a first aspect of the item and a second region corresponding to a second portion of the item information corresponding to second aspect of the item. The first region and second region of the multi-region metric space are each multi-dimensional regions. The method further comprises processing the multi-region metric space vector using an at least partially trained perspicacity model configured to define fuzzy clusters within the multi-region metric space; determining at least one parameter corresponding to the item based at least in part on at least one fuzzy cluster to which the perspicacity model assigned the multi-region space vector; and providing or causing providing of (a) a visual or audible representation of the at least one parameter or (b) a machine-readable representation of the at least one parameter as input to an application or program being operated on one or more processors.

In accordance with still another aspect, a computer program product is provided. The computer program product may comprise at least one non-transitory computer-readable storage medium having computer-readable program code portions stored therein. The computer-readable program code portions comprise executable portions configured to, when executed by one or more processors, cause the one or more processors to obtain item information corresponding to an item; and define a multi-region metric space vector based at least in part on the item information. The multi-region metric space vector is a vector within a multi-region metric space that comprises a first region corresponding to a first portion of the item information corresponding to a first aspect of the item and a second region corresponding to a second portion of the item information corresponding to second aspect of the item. The first region and second region of the multi-region metric space are each multi-dimensional regions. The computer-readable program code portions comprise executable portions further configured to, when executed by one or more processors, cause the one or more processors to process the multi-region metric space vector using an at least partially trained perspicacity model configured to define fuzzy clusters within the multi-region metric space; determine at least one parameter corresponding to the item based at least in part on at least one fuzzy cluster to which the perspicacity model assigned the multi-region space vector; and provide or cause providing of (a) a visual or audible representation of the at least one parameter or (b) a machine-readable representation of the at least one parameter as input to an application or program being operated on one or more processors.

According to yet another aspect, an apparatus (e.g., a computing entity) comprising at least one processor and at least one memory including computer program code is provided. In one embodiment, the at least one memory and the computer program code are configured to, with the at least one processor, cause the apparatus to at least obtain item information corresponding to an item; and define a multi-region metric space vector based at least in part on the item information. The multi-region metric space vector is a vector within a multi-region metric space that comprises a first region corresponding to a first portion of the item information corresponding to a first aspect of the item and a second region corresponding to a second portion of the item information corresponding to second aspect of the item. The first region and second region of the multi-region metric space are each multi-dimensional regions. The at least one memory and the computer program code are further configured to, with the at least one processor, cause the apparatus to at least process the multi-region metric space vector using an at least partially trained perspicacity model configured to define fuzzy clusters within the multi-region metric space; determine at least one parameter corresponding to the item based at least in part on at least one fuzzy cluster to which the perspicacity model assigned the multi-region space vector; and provide or cause providing of (a) a visual or audible representation of the at least one parameter or (b) a machine-readable representation of the at least one parameter as input to an application or program being operated on one or more processors.

BRIEF DESCRIPTION OF THE DRAWINGS

Figure 1:
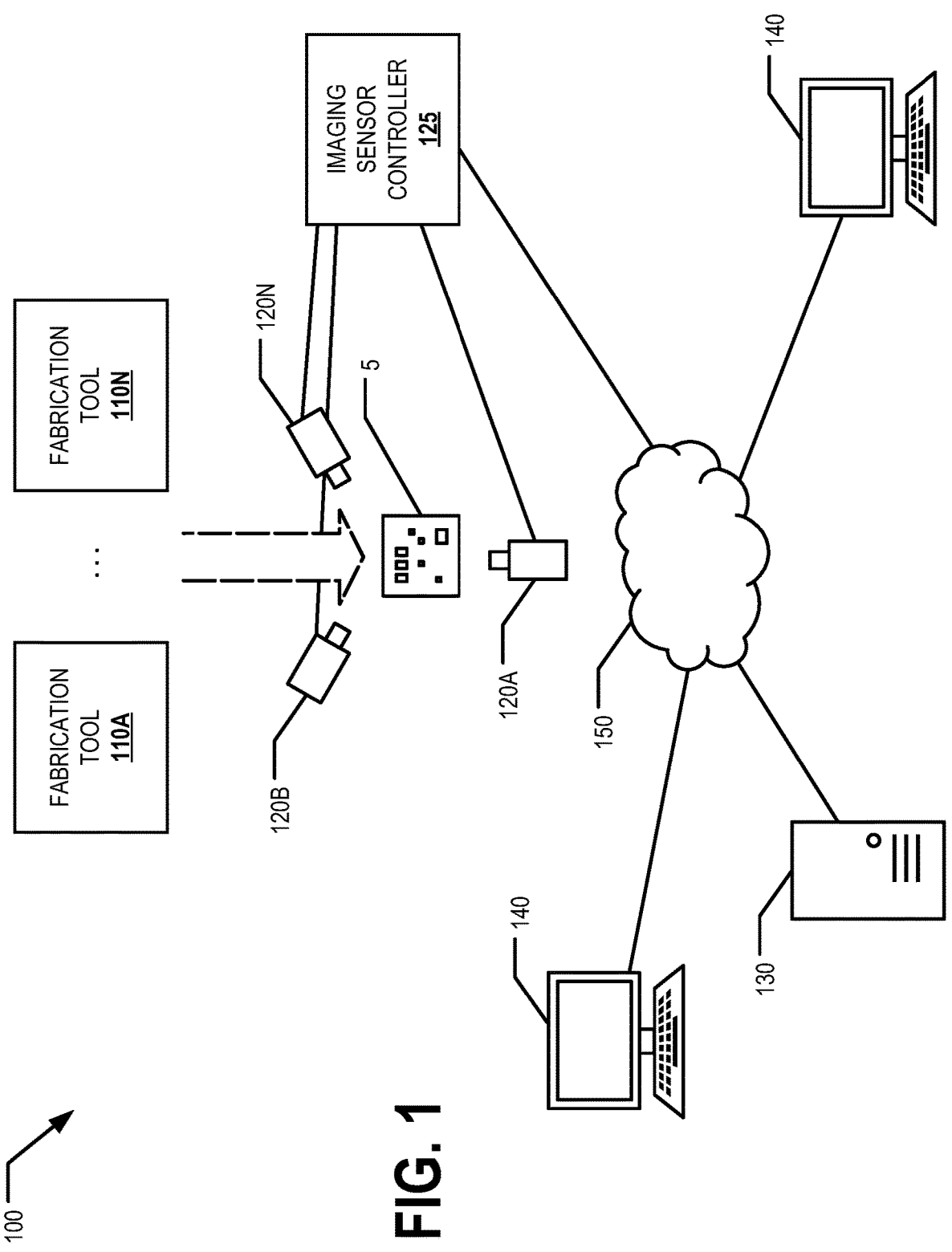
Figure 2:
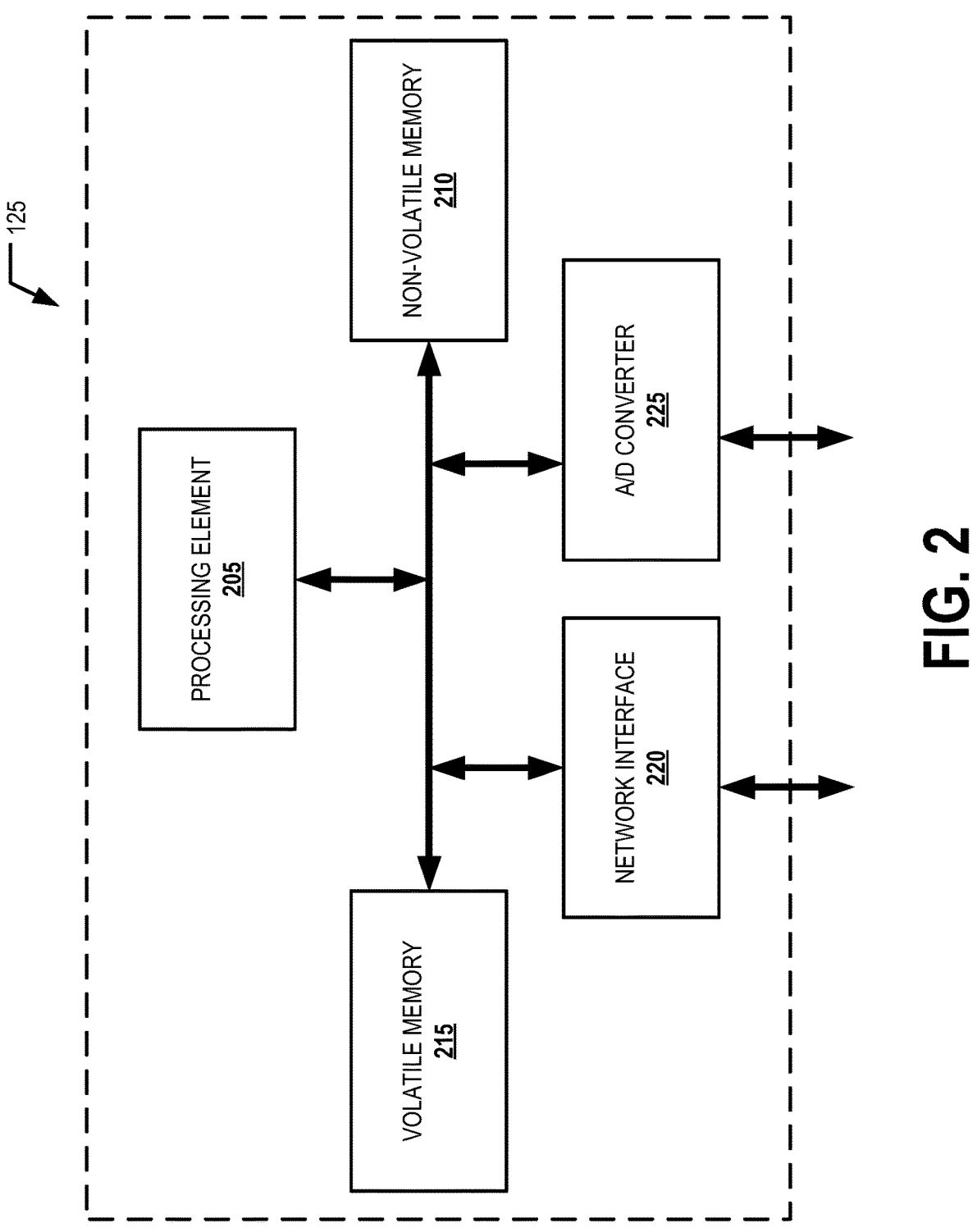
Figure 3:
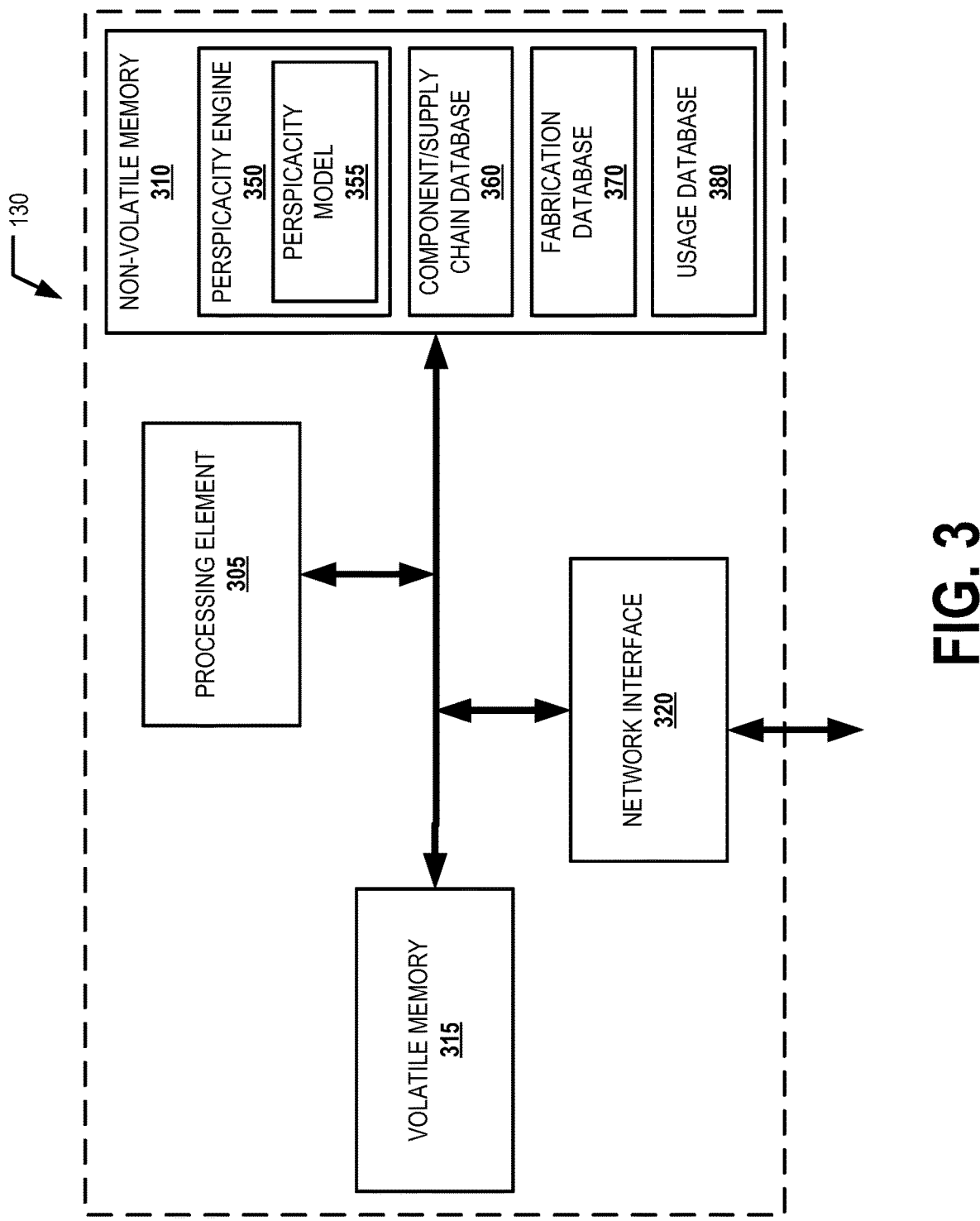
Figure 4:
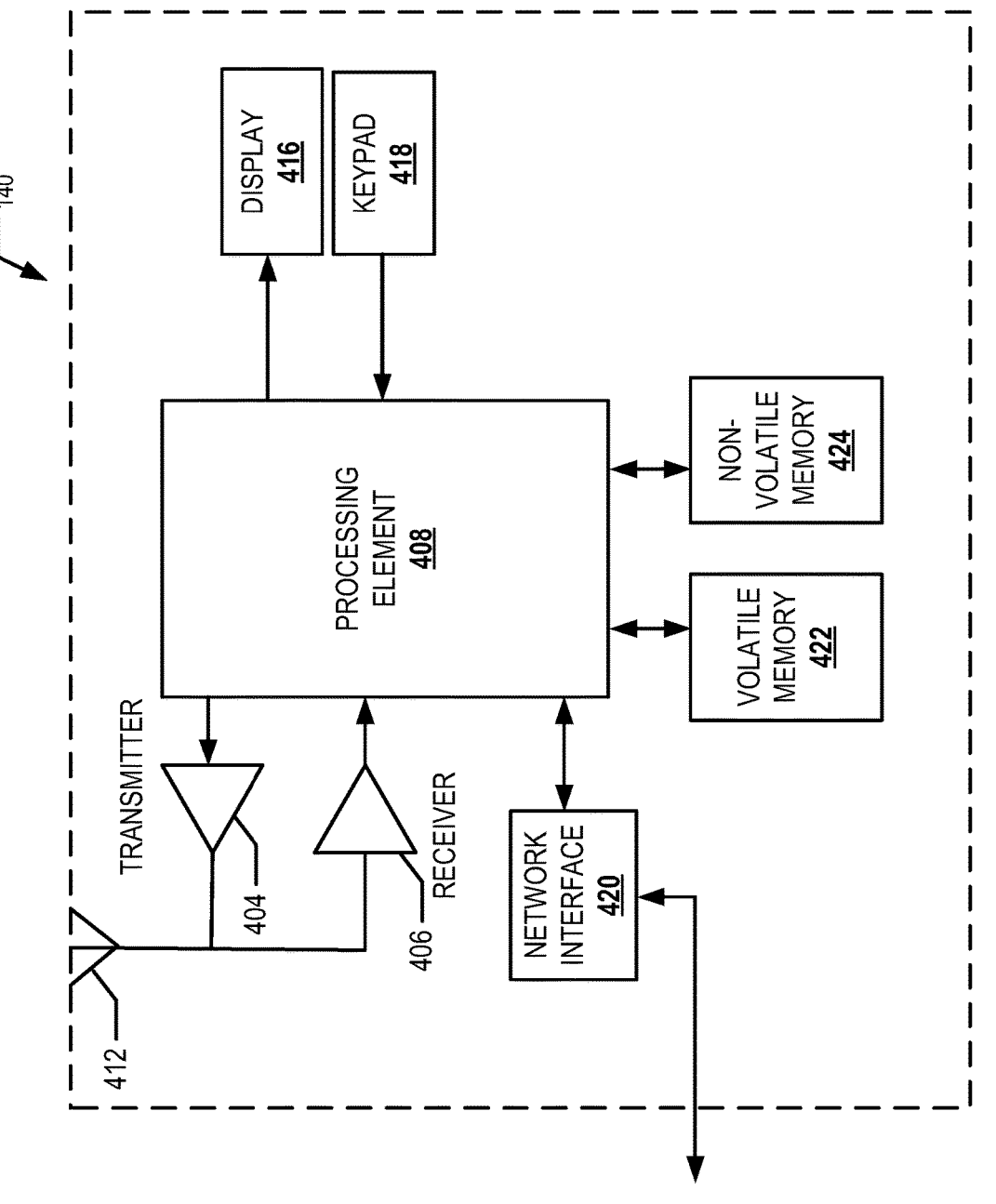
Figure 6:
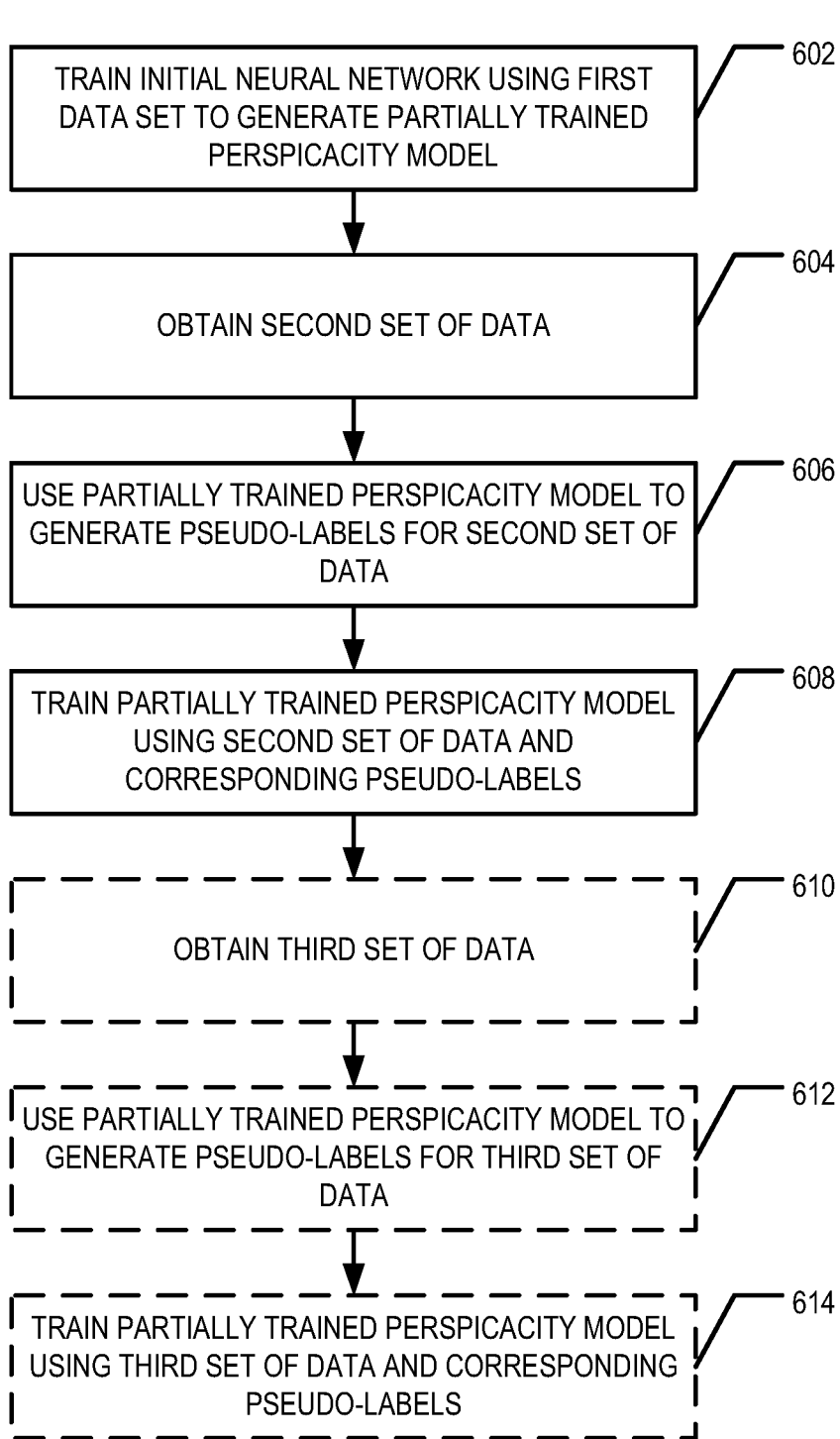

Having thus described the invention in general terms, reference will now be made to the accompanying drawings, which are not necessarily drawn to scale, and wherein:

FIG. 1 illustrates an overview of an example architecture that can be used to practice embodiments of the present invention;

FIG. 2 illustrates an example imaging sensor controller in accordance with some embodiments discussed herein;

FIG. 3 illustrates an example computing entity in accordance with some embodiments discussed herein;

FIG. 4 illustrates an example computing apparatus in accordance with some embodiments discussed herein;

FIG. 5 is a flowchart diagram of an example process performed by the computing entity of FIG. 3, for example, for using the perspicacity model to improve performance of a product, in accordance with some embodiments discussed herein; and FIG. 6 is a flowchart diagram of an example process performed by the computing entity of FIG. 3, for example, for training a perspicacity model, in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. The terms "approximately" and "substantially" refer to within appropriate engineering and/or manufacturing tolerances.

I. Overview

Various embodiments provide methods, apparatus, systems, computing devices, computing entities, and/or the like for providing perspicacity of the supply chain, components, assembly and/or fabrication, usage and usage environment of various products and making use of the provided perspicacity to improve product performance, to design products that exhibit improved performance and/or the like. In various embodiments, perspicacity model is trained using a machine learning technique. In various embodiments, the training of the perspicacity model comprises generating pseudo-labels for one or more data sets and training the perspicacity model using the one or more data sets and the corresponding pseudo-labels. In various embodiments, the perspicacity model is configured to generate and/or define fuzzy clusters in a multi-region metric space.

A product may be assigned to one or more fuzzy clusters based on the results of analyzing and/or processing product information corresponding to the product using the perspicacity model. Based on the one or more fuzzy clusters a product is assigned to, various insights regarding the product may be gleaned and used to improve the performance of the product itself (e.g., identifying a usage environment in which the product is expected to perform more effectively), design products that offer improved performance, and/or the like.

In various embodiments, a multi-region metric space is defined. The multi-region metric space comprises a plurality of multi-dimensional regions. A first region of the multi-region metric space corresponds to supply chain and component information. A second region of the multi-region metric space corresponds to assembly and fabrication information. A third region of the multi-region metric space corresponds to usage and usage environment information. The multi-region metric space defines the input space for a perspicacity engine comprising a machine learning-trained perspicacity model. In various embodiments, perspicacity executable instructions are configured to, upon execution by one or more processors, provide the perspicacity engine are stored in the memory of a computing entity.

In various embodiments, the computing entity is configured to cause execute the perspicacity executable instructions to cause the perspicacity engine (at least in part through the use of the perspicacity model) to perform smart binning and/or fuzzy clustering of products based on respective multi-region metric space vectors defined for the respective products. For example, the perspicacity engine (at least in part through the use of the perspicacity model) is configured to perform smart binning and/or fuzzy clustering of products based on respective multi-region metric space vectors defined for the respective products. A respective multi-region metric space vector is within the multi-region metric space and comprises one or more of supply chain and component information for the product, assembly and/or fabrication information for the product, or usage and usage environment information for the product.

In various embodiments, a multi-region metric space vector for a product is generated and/or defined by the perspicacity engine and processed by the (at least partially trained) perspicacity model. For example, the computing entity executes the perspicacity engine to generate and/or define a multi-region space vector for a product and to process the multi-region space vector for the product using the (at least partially trained) perspicacity model. The result of this processing includes the assignment of the product to one or more smart bins and/or fuzzy clusters defined by the (at least partially trained) perspicacity model within the multi-region metric space. In an example embodiment, a result of the processing of the multi-region metric space vector for a product by the (at least partially trained) perspicacity model includes a confidence metric indicating how likely the product is to be a member of one or more smart bins and/or fuzzy clusters defined within the multi-region metric space.

In various embodiments, at least one parameter corresponding to the product is determined based at least in part on the one or more smart bins and/or fuzzy clusters to which the product is assigned. For example, in an example embodiment, the perspicacity engine determines at least one parameter corresponding to the product based at least in part on the one or more smart bins and/or fuzzy clusters to which the product is assigned. In various embodiments, the at least one parameter corresponding to the product is a performance parameter corresponding to observed or predicted performance of the product. For example, in various embodiments, the at least one parameter corresponding to the product comprises a confidence of the product's ability to perform one or more usage tasks or to perform within one or more usage environments with at least a particular level of performance quality.

In various embodiments, the at least one parameter is provided. For example, the computing entity provides or causes the providing of a visual or audible representation of the at least one parameter, in an example embodiment. In another example, the computing entity provides or causes the providing of a machine-readable representation of the at least one parameter as input to an application or program operated on the one or more processors of the computing entity or another computing apparatus.

In various embodiments, the at least one parameter corresponding to the product is used to determine a preferred usage or usage environment for the product. In various embodiments, the at least one parameter corresponding to the product is used in coordination with the supply chain and component information and/or the assembly and/or fabrication information for the product to design new products are expected to perform with at least a particular level of performance quality in a particular usage environment.

Conventionally, various types of products are tested before being packaged and shipped for use. Such testing is conventionally performed in a pass or fail manner. However, a product that nominally passes a particular test may be able to perform to a particular level of performance quality for first usages and/or in a first usage environment, but not be able to perform to the particular level of performance quality for second usages and/or in a second usage environment. Thus, when the product is provided for the second usages and/or for use in the second usage environment, the product may be found to fail, despite having passed the particular test.

This lack of insight results in product failures that can have significant consequences. For example, the product may be a computer chip that, based on conventional testing, is expected to be a functional computer chip and is then incorporated into a data center. However, despite passing the conventional test, the computer chip may not be suited for performing well under the particular processing requirements of the data center and/or environmental conditions of the data center. The computer chip may then fail, causing significant down time for the data center and disruption of services due to technical failures. For example, on paper the computer chip may appear to be an appropriate computer chip for use in the data center. However, due to various supply chain and/or assembly and/or fabrication factors, the computer chip may not be able to perform at a particular level of performance quality for some usages and/or in particular usage environments. Therefore, technical problems exist as to how to determine which products will perform at acceptable performance levels for various usages and/or in various usage environments and how to determine at a design stage of a product, for example, whether the product will perform to a particular level of performance quality for a particular usage and/or in a particular usage environment.

Various embodiments provide technical solutions to these technical problems. For example, various embodiments provide perspicacity and/or insight regarding how supply chain factors and/or assembly and/or fabrication factors affect resulting products in ways that may not be apparent from product specification data. Through the tracking and processing of how products perform for various usages and/or in various usage environments and linking the usage and usage environment information with supply chain and component information and assembly and/or fabrication information appropriate usages and/or usage environments may be determined for existing products and/or products may be designed for improved performance in particular usages and/or usage environments. Thus, performance of products is improved by identifying the usages and usage environments in which the products are best suited and identifying the usages and usage environments in which the products are likely to fail. For example, various embodiments enable the prevention of product failures caused by a product being used in a usage or usage environment for which the product is nominally suited, but due to various factors, is not well suited. Therefore, various embodiments provide technical improvements.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or that are functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SWIM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 is a schematic diagram of an example architecture 100 for the use and training of a perspicacity engine comprising a machine learning-trained perspicacity model. The architecture 100 includes one or more imaging sensors 120 (e.g., 120A, 120B, 120N) configured to capture one or more inspection images of at least partially fabricated products 5. In various embodiments, each of the at least partially fabricated products 5 were fabricated by a respective at least one of one or more fabrication tools 110 (e.g., 110A, 110N). The architecture 100 further includes an imaging sensor controller 125 configured to control the operation of the one or more imaging sensors 120 and to receive imaging data captured by the one or more imaging sensors 120.

The architecture 100 further comprises one or more computing entities 130. In various embodiments, the computing entity 130 is a server or cloud-based computational resource. For example, the computing entity 130 is configured to execute a perspicacity engine; actively train a perspicacity engine and/or perspicacity model; generate and/or store a component/supply chain database, fabrication database, and/or usage database; and/or the like, in various embodiments. In an example embodiment, the imaging sensor controller 125 converts the imaging data into images (e.g., via A/D converter 225 and/or the like) and provides the images to the computing entity 130. In an example embodiment, the imaging sensor controller 125 provides the imaging data to the computing entity 130 and the computing entity 130 converts the imaging data into images. For example, the computing entity 130 is configured to receive imaging data and/or inspection images, in various embodiments.

The architecture 100 may further comprise one or more computing apparatuses 140. In various embodiments, the computing apparatuses 140 are computing apparatuses in communication with the computing entity 130. For example, a computing apparatus 140 is configured to provide information/data to the computing entity 130, possibly in response to a request for information/data. For example, a manufacturer or vendor that manufactured and/or supplied a component may operate and/or have operated on their behalf, a computing apparatus 140 configured to provide supply chain and component information corresponding to one or more components. In another example, a customer that has purchased one or more products may operate and/or have operated on their behalf, a computing apparatus 140 configured to provide usage and usage environment data for one or more products. In another example, a computing apparatus 140 may be used to receive user input provided by human technician and/or input provided by a fabrication element 110 and provide assembly and/or fabrication information. For example, respective computing apparatuses 140 may provide supply chain and component information, assembly and/or fabrication information, and/or usage and usage environment information such that the computing entity 130 receives the supply chain and component information, assembly and/or fabrication information, and/or usage and usage environment information. In various embodiments, a computing apparatus 140 is a user device such as a desktop computer, laptop, tablet, handheld device, smartphone, and/or the like. In various embodiments, a computing apparatus 140 is a server and/or the like.

In an example embodiment, the imaging sensor controller 125, computing entity 130, and/or computing apparatus 140 are in direct wired or wireless communication with one another. In various embodiments, the imaging sensor controller 125, computing entity 130, and/or computing apparatus 140 are in communication with one another via one or more wired and/or wireless networks 150. In various embodiments, the one or more wired and/or wireless networks 150 may comprise Wi-Fi, a local area network (LAN), wireless LAN (WLAN), the Internet, and/or other appropriate digital communication channel.

Example Imaging Sensor Controller

FIG. 2 provides a schematic of an imaging sensor controller 125 according to one embodiment of the present invention. In various embodiments, the one or more imaging sensors 120 are digital cameras, high definition digital cameras, optical cameras, infrared cameras, ultraviolet cameras, radar, lidars, and/or other sensors configured to capture image data of an at least partially fabricated product 5. In various embodiments, the imaging sensors 120 are configured to capture imaging data of the at least partially fabricated product 5 from one or more angles and/or perspectives under one or more lighting conditions (e.g., low light, bright light, infrared light, red light, white light, blue light, ultraviolet light, dark field, light field, and/or the like).

In various embodiments, the imaging sensor controller 125 is configured to control the operation of the one or more imaging sensors 120. For example, the imaging sensor controller 125 may be configured to cause the one or more imaging sensors 120 to capture imaging data, control the lighting conditions under which the imaging data is captured, and/or the like. In various embodiments, the imaging sensor controller 125 is configured to receive the imaging data captured by the imaging sensors. In an example embodiment, the imaging sensor controller 125 converts the imaging data into images (e.g., via A/D converter 225 and/or the like) and provides the images to the computing entity 130. In an example embodiment, the imaging sensor controller 125 provides the imaging data (e.g., in addition to or instead of the images) to the computing entity 130.

In general, the terms controller, computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, relays, routers, network access points, base stations, controller devices, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar actions, which terms are used herein interchangeably. In one embodiment, these functions, operations, and/or processes can be performed on data, content, information, and/or the like, and such terms are used herein interchangeably.

As indicated, in one embodiment, the imaging sensor controller 125 may also include one or more network interfaces 220 and/or other communication interfaces for communicating with various computing entities, such as by communicating data, content, information, control signals, etc. that can be transmitted, received, operated on, processed, displayed, stored, and/or the like.

As shown in FIG. 2, in one embodiment, the imaging sensor controller 125 may include or be in communication with one or more processing elements 205 (also referred to as processors, processing circuitry, and/or the like) that communicate with other elements within the imaging sensor controller 125 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the imaging sensor controller 125 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like. For example, the non-volatile storage or memory media 210 may store executable instructions configured to control operation of the one or more imaging sensors 120 (e.g., to capture image data of the at least partially fabricated products 5), control the lighting conditions under which the imaging sensors 120 capture image data of the at least partially fabricated products 5, transform and/or convert the imaging data to images, provide the imaging data and/or images such that the computing entity 130 receives the imaging data and/or images, and/or the like. For example, the non-volatile storage or memory media 210 may be configured to store the imaging data captured and provided by the imaging sensors 120.

In one embodiment, the imaging sensor controller 125 may further include or be in communication with volatile media (also referred to as volatile storage, memory, memory storage, memory circuitry and/or the like). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the imaging sensor controller 125 with the assistance of the processing element 205 and operating system.

As indicated, in one embodiment, the imaging sensor controller 125 may also include one or more network interfaces 220 and/or other communication interfaces for communicating with various computing entities, such as by communicating data, content, information, etc. that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the imaging sensor controller 125 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the imaging sensor controller 125 may include or be in communication with one or more input elements, such as buttons, a keyboard input, a mouse input, a touch screen/display input, motion input, movement input, audio input, pointing device input, joystick input, keypad input, and/or the like. The imaging sensor controller 125 may also include or be in communication with one or more output elements (not shown), such as audio output, video output, screen/display output, motion output, movement output, and/or the like.

In various embodiments, the imaging sensor controller 125 further comprises one or more analog-to-digital (A/D) converters 225. In various embodiments, one or more A/D converters 225 are configured to generate and provide control signals configured to control the one or more imaging sensors 120 and/or lighting devices (not shown) to control the lighting conditions under which the imaging sensors 120 capture images of an at least partially fabricated product 5. In various embodiments, one or more A/D converters 225 are configured to receive imaging data captured by the imaging sensors 120, convert the imaging data into one or more images, provide the imaging data and/or one or more images to the processing element 205 and/or memory 210, 215, and/or the like.

Example Computing Entity

In various embodiments, the computing entity 130 is configured to receive imaging data and/or one or more images and corresponding meta data, receive functional test results, execute a product inspection engine, identify training images and automatically associate labeling data with the training images based on the inspection results, perform various actions corresponding to the further fabrication and/or packaging of an at least partially fabricated product based on the results of the inspection results, and/or the like. In various embodiments, the computing entity 130 is and/or is part of a server, network of servers, computer, Cloud-based computing resource, and/or the like. FIG. 3 illustrates a schematic of an computing entity 130 according to one embodiment of the present invention.

In general, the terms controller, computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, relays, routers, network access points, base stations, controller devices, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar actions, and such terms are used herein interchangeably. In one embodiment, these functions, operations, and/or processes can be performed on data, content, information, and/or the like.

As indicated, in one embodiment, the computing entity 130 may also include one or more network interfaces 320 and/or other communication interfaces for communicating with various computing entities, such as by communicating data, content, information, control signals, and/or similar terms used herein interchangeably that can be transmitted, received, operated on, processed, displayed, stored, and/or the like.

As shown in FIG. 3, in one embodiment, the computing entity 130 may include or be in communication with one or more processing elements 305 (also referred to as processors, processing circuitry, and/or similar terms used herein interchangeably) that communicate with other elements within the computing entity 130 via a bus, for example. As will be understood, the processing element 305 may be embodied in a number of different ways.

For example, the processing element 305 may be embodied as one or more CPLDs, microprocessors, multi-core processors, coprocessing entities, ASIPs, microcontrollers, and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, ASICs, FPGAs, PLAs, hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the computing entity 130 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

For example, the non-volatile storage or memory media 310 may store executable instructions configured to cause receipt and storage of supply chain and component information, assembly and/or fabrication information, and/or usage and usage environment information (e.g., in respective ones of component/supply chain database 360, fabrication database 370, and usage database 380), execute a perspicacity engine 350 and/or a perspicacity model 355 of the product inspection engine, provide or cause the providing of at least one parameter corresponding to a product, train a perspicacity model, generate pseudo-labels for sets of data and then use the sets of data and corresponding pseudo-labels to further train the perspicacity model, and/or the like.

In one embodiment, the computing entity 130 may further include or be in communication with volatile media (also referred to as volatile storage, memory, memory storage, memory circuitry and/or similar terms used herein interchangeably). In one embodiment, the volatile storage or memory may also include one or more volatile storage or memory media 315, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 305. Thus, the databases, database instances, database management systems, data, applications, programs, program modules, scripts, source code, object code, byte code, compiled code, interpreted code, machine code, executable instructions, and/or the like may be used to control certain aspects of the operation of the computing entity 130 with the assistance of the processing element 305 and operating system.

As indicated, in one embodiment, the computing entity 130 may also include one or more network interfaces 320 and/or other communication interfaces for communicating with various computing entities, such as by communicating data, content, information, etc. that can be transmitted, received, operated on, processed, displayed, stored, and/or the like. Such communication may be executed using a wired data transmission protocol, such as FDDI, DSL, Ethernet, ATM, frame relay, DOC SIS, or any other wired transmission protocol. Similarly, the computing entity 130 may be configured to communicate via wireless external communication networks using any of a variety of protocols, such as GPRS, UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR protocols, NFC protocols, Wibree, Bluetooth protocols, wireless USB protocols, and/or any other wireless protocol.

Although not shown, the computing entity 130 may include or be in communication with one or more input elements, such as buttons, a keyboard input, a mouse input, a touch screen/display input, motion input, movement input, audio input, pointing device input, joystick input, keypad input, and/or the like. The computing entity 130 may also include or be in communication with one or more output elements (not shown), such as audio output, video output, screen/display output, motion output, movement output, and/or the like.

In an example embodiment, the image sensor controller 125 is a component of and/or incorporated into the computing entity 130.

Example Computing Apparatus

FIG. 4 provides an illustrative schematic representative of a computing apparatus 140 that can be used in conjunction with embodiments of the present invention. In various embodiments, the computing apparatus 140 is intended for user interaction therewith. For example, the computing apparatus 140 may be configured to display and/or audibly provide a visual or audible representation of the at least one parameter corresponding to a product and/or the like. In an example embodiment, the computing apparatus 140 is configured to receive user input or fabricating tool input indicating supply chain and component information, assembly and/or fabrication information, and/or usage and usage environment information for one or more products. For example, a computing apparatus 140 may perform one or more functional tests on one or more products while the products are in their respective usage environments, generate respective performance logs based on the one or more functional tests performed and the respective results thereof, and provide (e.g., transmit) the performance logs for receipt by the computing entity 130, in an example embodiment.

In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 4, the computing apparatus 140 can include an antenna 412, a transmitter 404 (e.g., radio), a receiver 406 (e.g., radio), and a processing element 408 (e.g., CPLDs, microprocessors, multi-core processors, coprocessing entities, ASIPs, microcontrollers, and/or controllers) that provides signals to and receives signals from the transmitter 404 and receiver 406, respectively.

The signals provided to and received from the transmitter 404 and the receiver 406, respectively, may include signaling information/data in accordance with air interface standards of applicable wireless systems. In this regard, the computing apparatus 140 may be capable of operating with one or more air interface standards, communication protocols, modulation types, and access types. More particularly, the computing apparatus 140 may operate in accordance with any of a number of wireless communication standards and protocols, such as those described above with regard to the computing entity 130. In a particular embodiment, the computing apparatus 140 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing apparatus 140 may operate in accordance with multiple wired communication standards and protocols, such as those described above with regard to the computing entity 130 via a network interface 420.

Via these communication standards and protocols, the computing apparatus 140 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing apparatus 140 can also download changes, add-ons, and updates, for instance, to its firmware, software (e.g., including executable instructions, applications, program modules), and operating system.

The computing apparatus 140 may also comprise a user interface (that can include a display 416 coupled to a processing element 308) and/or a user input interface (coupled to a processing element 408). For example, the user interface may be a user application, browser, user interface, and/or similar words used herein interchangeably executing on and/or accessible via the computing apparatus 140 to interact with and/or cause display of inspection results, common features identified by the root cause engine, training images and associated labeling data, and/or the like, as described herein. The user input interface can comprise any of a number of devices or interfaces allowing the computing apparatus 140 to receive data, such as a keypad 418 (hard or soft), a touch display, voice/speech or motion interfaces, or other input device. In embodiments including a keypad 418, the keypad 418 can include (or cause display of) the conventional numeric (0-9) and related keys (#, *), and other keys used for operating the computing apparatus 140 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The computing apparatus 140 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the computing apparatus 140. As indicated, this may include a user application that is resident on the entity or accessible through a browser or other user interface for communicating with the computing entity 130 and/or various other computing entities.

In another embodiment, the computing apparatus 140 may include one or more components or functionality that are the same or similar to those of the computing entity 130, as described in greater detail above. As will be recognized, these architectures and descriptions are provided for exemplary purposes only and are not limiting to the various embodiments.

In various embodiments, the computing apparatus 140 may be embodied as an artificial intelligence (AI) computing entity or smart device, some examples of which include an Amazon Echo® device, Amazon Echo Dot® device, Amazon Show™ device, Google Home® device, and/or the like. Accordingly, the computing apparatus 140 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. Exemplary System Operations

Various embodiments provide methods, apparatus, systems, computing devices, computing entities, and/or the like for providing perspicacity of the supply chain, components, assembly and/or fabrication, usage and usage environment of various products and making use of the provided perspicacity to improve product performance, to design products that exhibit improved performance and/or the like. In various embodiments, a component, assembly, and usage perspicacity (perspicacity) model is trained using a machine learning technique. In various embodiments, the training of the perspicacity model comprises generating pseudo-labels for one or more data sets and training the perspicacity model using the one or more data sets and the corresponding pseudo-labels. In various embodiments, the perspicacity model is configured to generate and/or define fuzzy clusters in a multi-region metric space. A product may be assigned to one or more fuzzy clusters based on the results of analyzing and/or processing product information corresponding to the product using the perspicacity model. Based on the one or more fuzzy clusters a product is assigned to, various insights regarding the product may be gleaned and used to improve the performance of the product itself (e.g., identifying a usage environment in which the product is expected to perform more effectively), design products that offer improved performance, and/or the like.

In various embodiments, the perspicacity model generates and/or defines fuzzy clusters within particular regions of the multi-region metric space. For example, products may be clustered based on the first region portion of their respective multi-region metric space vectors. In another example, products may be clustered based on the second region portions of their respective multi-region metric space vectors. In yet another example, products may be clustered based on both their first and second region portions of their respective multi-region metric space vectors. As used herein, the ith region portion of a multi-region metric space vector is the projection of the multi-region metric space vector in the ith region of the multi-region metric space.

In an example embodiment, the perspicacity engine and/or the perspicacity model is configured and/or trained to determine whether or not products that are assigned to a common cluster in the first region, second region, or first and second regions are also assigned to a common cluster in the third region, for example. In an example embodiment, the perspicacity engine and/or the perspicacity model is configured and/or trained to assign a product to a third region cluster based on one or more first region clusters, second region clusters, and/or first and second region clusters to which the product is assigned. In an example embodiment, the perspicacity engine and/or the perspicacity model is configured and/or trained to determine respective likelihoods or probabilities that a product is a member of one or more third region clusters based on the likelihood of membership of the product in one or more first region clusters, second region clusters, and/or first and second region clusters.

In various embodiments, a multi-region metric space is defined. The multi-region metric space comprises a plurality of multi-dimensional regions. A first region of the multi-region metric space corresponds to supply chain and component information. A second region of the multi-region metric space corresponds to assembly and fabrication information. A third region of the multi-region metric space corresponds to usage and usage environment information. The multi-region metric space defines the input space for a perspicacity engine comprising a machine learning-trained perspicacity model.

In various embodiments, the first region comprises a plurality of dimensions corresponding to various elements of supply chain and component information. In various embodiments, the various elements of supply chain and component information is configured to identify a component that is used and/or incorporated into a product, provide information regarding the component and how the component was obtained for use in assembling and/or fabricating the product. For example, in various embodiments, the first region comprises one or more dimensions that encode a respective component identifier configured to identify a component used in the fabrication of a product or incorporated into a product; specification information (e.g., use requirements, detailed description of workmanship, materials or processes, size and shape, abilities, performance characteristics, and/or the like) for the component; a manufacturer of the component; a make, model, lot number, and/or the like of the component; when and where the component was manufactured; and/or the like.

In various embodiments, the second region comprises a plurality of dimensions corresponding to various elements of assembly and fabrication information. In various embodiments, the various elements of assembly and fabrication information are configured to identify when and/or where a product was assembled and/or fabricated, specification information for the product (e.g., use requirements, detailed description of workmanship, materials or processes, size and shape, abilities, performance characteristics, and/or the like) for the product, identify one or more fabrication tools 110 used in the assembly or fabrication of the product, one or more processes used in the assembly and/or fabrication of the product, results of one or more visual inspections and/or functional tests of the product, and/or the like.

In various embodiments, the third region comprises a plurality of dimensions corresponding to various elements of usage and usage environment information. In various embodiments, the various elements of usage and usage environment information are configured to identify one or more uses of the product (e.g., gaming, medical devices, data center, automotive, etc.), information regarding the usage environment of the product (e.g., average temperature, average humidity, etc.), performance logs (e.g., comprising performance information and results of functional tests completed while the product was located in the usage environment), and/or the like.

In various embodiments, perspicacity executable instructions are configured to, upon execution by one or more processors, provide the perspicacity engine are stored in the memory of a computing entity. In various embodiments, the computing entity 130 is configured to cause execute the perspicacity executable instructions to cause the perspicacity engine 350 (at least in part through the use of the perspicacity model 355) to perform smart binning and/or fuzzy clustering of products based on respective multi-region metric space vectors defined for the respective products. For example, the perspicacity engine (at least in part through the use of the perspicacity model) is configured to perform smart binning and/or fuzzy clustering of products based on respective multi-region metric space vectors defined for the respective products. A respective multi-region metric space vector is within the multi-region metric space and comprises one or more of supply chain and component information for the product, assembly and/or fabrication information for the product, or usage and usage environment information for the product.

In various embodiments, a multi-region metric space vector for a product is generated and/or defined by the perspicacity engine 350 and processed by the (at least partially trained) perspicacity model 355. For example, the computing entity executes the perspicacity engine to generate and/or define a multi-region space vector for a product and to process the multi-region space vector for the product using the (at least partially trained) perspicacity model. The result of this processing includes the assignment of the product to one or more smart bins and/or fuzzy clusters defined by the (at least partially trained) perspicacity model within the multi-region metric space. In an example embodiment, a result of the processing of the multi-region metric space vector for a product by the (at least partially trained) perspicacity model includes a confidence metric indicating how likely the product is to be a member of one or more smart bins and/or fuzzy clusters defined within the multi-region metric space.

In various embodiments, at least one parameter corresponding to the product is determined based at least in part on the one or more smart bins and/or fuzzy clusters to which the product is assigned. For example, in an example embodiment, the perspicacity engine determines at least one parameter corresponding to the product based at least in part on the one or more smart bins and/or fuzzy clusters to which the product is assigned. In various embodiments, the at least one parameter corresponding to the product is a performance parameter corresponding to observed or predicted performance of the product. For example, in various embodiments, the at least one parameter corresponding to the product comprises a confidence of the product's ability to perform one or more usage tasks or to perform within one or more usage environments with at least a particular level of performance quality.

In various embodiments, the at least one parameter acts as a non-binary test result for the product. For example, conventionally, it is determined whether a product passes and is able to be provided and/or shipped for customer use or whether the product fails and should be provided and/or shipped for customer use. In various embodiments, the at least one parameter may indicate that the product is functional (e.g., with at least a particular level of performance quality) for various usages and/or in use in various usage environments but it not functional (e.g., is not expected to perform with at least the particular level of performance quality) for other usages and/or in other usage environments.

In various embodiments, the at least one parameter may be used to identify similar products that are expected to have similar performance characteristics (e.g., be able to perform to at least the particular level of performance quality in the same or overlapping usages or usage environments) or similar products that are expected to have different performance characteristics. In various embodiments, a first product and second product are similar to one another when the first region distance between the first region portion of a first multi-region metric space vector for the first product and the first region portion of a second multi-region metric space vector for the second product are within a first region threshold distance of one another. In various embodiments, the first product and the second product are similar to one another when the second region distance between the second region portion of the first multi-region metric space vector for the first product and the second region portion of a second multi-region metric space vector for the second product are within a second region threshold distance of one another. In an example embodiment, the first product and the second product are similar when both the first region distance between the first multi-region metric space vector and the second multi-region metric space vector is less than the first region threshold and the second region distance between the first multi-region metric space vector and the second multi-region metric space vector is less than the second region threshold. In various embodiments, the first product and the second product have similar performance characteristics when the third region distance between the third region portion of the first multi-region metric space vector for the first product and the third region portion of the second multi-region metric space vector for the second product is less than a third region threshold. In various embodiments, the first region distance, second region distance, and/or third region distance are measured using cosine distance or another metric that is a function of cosine similarity.

In various embodiments, the perspicacity model and/or the at least one parameter may be used to identify similarities and/or differences between similar products with similar and/or different performance characteristics. For example, the perspicacity model and/or the at least one parameter may be configured to identify differences between similar products where one of the products does perform with at least the particular level of performance quality for a particular usage and/or usage environment and the other product does not perform with at least the particular level of performance quality for the particular usage and/or usage environment. This information may then be used to design new products that are particularly suited to perform with at least the particular level of performance quality for the particular usage and/or usage environment.

In various embodiments, the perspicacity model is configured to predict at least a portion of the multi-region metric space vector for a product corresponding to at least one region, given the multi-region metric space vector for the product for the remainder of the regions. For example, given the first region portion and second region portion of the metric space vector for a product, the perspicacity engine is configured to use the perspicacity model to predict the third region portion of the multi-region metric space vector for the product, in an example embodiment.

In various embodiments, the at least one parameter is provided. For example, the computing entity provides or causes the providing of a visual or audible representation of the at least one parameter, in an example embodiment. In another example, the computing entity provides or causes the providing of a machine-readable representation of the at least one parameter as input to an application or program operated on the one or more processors of the computing entity or another computing apparatus.

In various embodiments, the at least one parameter corresponding to the product is used to determine a preferred usage or usage environment for the product. In various embodiments, the at least one parameter corresponding to the product is used in coordination with the supply chain and component information and/or the assembly and/or fabrication information for the product to design new products are expected to perform with at least a particular level of performance quality in a particular usage environment.

In various embodiments, the perspicacity model is actively trained. As used herein, the term "actively training" refers to the continued training of a machine learning trained model while the perspicacity engine comprising the perspicacity model is being used to generate and provide the at least one parameter for one or more products. In various embodiments, the active learning of the perspicacity model enables the perspicacity model to learn to analyze new versions of products, new (similar) products, and/or the like without requiring a new model to be trained. For example, the perspicacity model may be trained based on a combination of labeled data (e.g., human annotated data) and pseudo-labeled data (e.g., data annotated by the perspicacity engine).

In various embodiments, the perspicacity model is a self-learning model. For example, in an example embodiment, the perspicacity model does not need to operate from a fixed set of bins or clusters to classify products (e.g., based on their respective multi-region metric space vectors). Rather, the perspicacity model can determine and/or learn to distinguish (fine-grain) bins or clusters over time.

In various embodiments, the active learning of the perspicacity model enables the perspicacity model to achieve better accuracy in the assigning of products to bins or clusters and better accuracy at identifying important similarities and/or differences between products (e.g., differences that cause products to have the same or different at least one parameters) as time progresses.

In various embodiments, the product is a computer chip, processor, graphics processing unit (GPU), and/or the like. In various embodiments, the products may be various items for which perspicacity regarding the supply chain and components used to assemble or fabricate the product; when, where, and how the product is assembled and/or fabricated; and/or the resulting performance of the product for performing one or more usage tasks in one or more usage environments is desired.

Example Use of a Perspicacity Engine

FIG. 5 provides a flowchart illustrating various processes, operations, procedures, and/or the like that are performed, by a computing entity 130, for example, in accordance with an example embodiment to use a perspicacity engine comprising an at least partially trained perspicacity model.

Starting at step/operation 502, product information corresponding to a product is obtained. For example, the computing entity 130 comprises means, such as processing element 305, memory 310, 315, network interface 320, and/or the like, for obtaining product information corresponding to a product. For example, the computing entity 130 may receive at least a portion of the product information (e.g., via network interface 320), access at least a portion of the product information (e.g., from a data store stored in memory 310, 315 such as component/supply chain database 360, fabrication database 370, usage database 380, and/or the like), and/or otherwise obtain the product information. In various embodiments, the computing entity 130 may use one or more application program interfaces (APIs) to access the product information from various data stores.

In various embodiments, the product information comprises at least one of supply chain and component information, assembly and fabrication information, or usage and usage environment information. In various embodiments, at least a portion of the product information is received from a computing apparatus 140 operated by and/or on behalf of a supplier or vendor who fabricated the component and/or through which the component was obtained. In various embodiments, at least a portion of the product information is received from an imaging sensor controller 125 operating the fabrication facility where the product was fabricated, one or more computing apparatuses 130 that are part of the fabrication facility and/or operated by fabrication facility personnel. In various embodiments, at least a portion of the product information is received from a computing apparatus 130 located at the usage location of the product and configured to generate and/or provide usage environment information, cause one or more performance tests to be performed on the product, generate one or more performance logs tracking performance of the product, and/or the like.

In various embodiments, the supply chain and component information of the product information comprises identifiers configured to identify of one or more respective components that were used and/or incorporated into the product, information regarding the respective components and how the respective component were obtained for use in assembling and/or fabricating the product. For example, in various embodiments, the supply chain and component information of the product information comprises respective component identifiers configured to identify respective components used in the fabrication of the product or incorporated into product; respective specification information (e.g., use requirements, detailed description of workmanship, materials or processes, size and shape, abilities, performance characteristics, and/or the like) for the respective components; respective manufacturers of the respective components; respective makes, models, lot numbers, and/or the like of the respective components; when and where the respective components were manufactured; and/or the like.

In various embodiments, the assembly and fabrication information of the product information indicates and/or identifies when and/or where the product was assembled and/or fabricated, specification information for the product (e.g., use requirements, detailed description of workmanship, materials or processes, size and shape, abilities, performance characteristics, and/or the like) for the product, one or more fabrication tools 110 used in the assembly or fabrication of the product, one or more processes used in the assembly and/or fabrication of the product, results of one or more visual inspections and/or functional tests of the product, and/or the like.

In various embodiments, the usage and usage environment information identifies and/or indicates one or more usage tasks for which the product is used (e.g., gaming, medical devices, data center, automotive, etc.), information regarding the usage environment of the product (e.g., environmental conditions of the environment in which the product is used (e.g., average temperature, average humidity, etc.), performance constraints corresponding to the environment in which the product is used, performance requirements for the environment in which the product is used, and/or the like), performance logs (e.g., comprising performance information and results of functional tests completed while the product was located in the usage environment), and/or the like. In various embodiments, the usage and usage environment information is generated by the computing entity 130 and/or a computing apparatus 140 based on returned products (e.g., products that customers have returned because the products failed, did operate at a desired quality level, and/or the like), performance logs generated during functioning of products in respective usage environments (e.g., to perform respective usage tasks), monitoring of product performance in the field, and/or the like.

At step/operation 504, the computing entity 130 generates and/or defines at least a portion of the multi-region metric space vector for the product based on the obtained product information. For example, the computing entity 130 comprises means, such as processor 304, memory 310, 315, and/or the like, for generating and/or defining at least a portion of the multi-region metric space vector for the product based on the obtained product information. In various embodiments, the at least a portion of the multi-region metric space vector for the product is generated and/or defined by transforming, formatting, translating, arranging, and/or the like elements of the product information into a predefined vector format and/or scheme.

For example, the predefined vector format corresponds to and/or provides a translation or mapping of the dimensionality of the multi-region metric space to the various elements of the product information. For example, the format may indicate which dimension(s) of the multi-region metric space corresponds to component identifiers identifying components incorporated into product.

The predefined vector scheme corresponds to and/or provides semantic meaning for the values included in the multi-region metric space vector. For example, the predefined vector scheme provides a translation or mapping of the language of the product information to the "language" of the multi-region metric space vector (and/or vice-versa).

In various embodiments, the perspicacity engine 350 comprises a neural network trained to generate a multi-region metric space vector for a product based on the product information for the product. For example, the perspicacity model 350 comprises a neural network configured to receive as input the product information for the product and provide as output a multi-region metric space vector for the product, in an example embodiment. In an example embodiment, the perspicacity engine 350 receives the product information for the product as part of an API call requesting the perspicacity engine 350 provide at least one parameter regarding the product. in an example embodiment, the perspicacity engine 350 receives an API call requesting the perspicacity engine provide at last one parameter regarding the product and the perspicacity engine 350 interacts with one or more data stores (e.g., via appropriate API calls) to receive the product information from the one or more data stores.

As described above, the multi-region metric space comprises a first region corresponding to supply chain and component information, a second region corresponding to assembly and fabrication information, and a third region corresponding to usage and usage environment information. The multi-region metric space vector comprises a first region portion that corresponds to the plurality of dimensions of the first region, a second region portion that corresponds to the plurality of dimensions of the second region, and a third region portion that corresponds to the plurality of dimensions of the third region. Generating and/or defining the multi-region metric space vector comprises generating and/or defining the first region portion, second region portion, and/or third region portion of the multi-region metric space vector, in various embodiments.

In an example embodiment, generating and/or defining the multi-region metric space vector comprises generating and/or defining the first region portion and the second region portion of the multi-region metric space vector for the product and perspicacity engine is configured to use the perspicacity model to predict the third region portion of the multi-region metric space vector by processing the first region portion and the second region portion of the multi-region metric space vector for the product.

In an example embodiment, the multi-region metric space vector for the product may be incomplete. For example, values for each of the dimensions of the first region may be defined in the multi-region metric space vector, but values may not be defined for each of the dimensions of the second region. In another example, values for each of the dimensions of the first region may be defined in the multi-region metric space vector, and values for each of the dimensions of the second region may be defined in the multi-region metric space vector, but values may not be defined for each of the dimensions of the third region. For example, the perspicacity model may be configured and/or trained to predict the projection of the multi-region metric space vector in the third region based on the projections of the multi-region metric space vector in the first and second regions.

At step/operation 506, the computing entity 130 executes the perspicacity engine 350 to process the multi-region metric space vector using the perspicacity model 355. For example, the computing entity 130 comprises means, such as processing element 305, memory 310, 315, and/or the like, for executing the perspicacity engine 350 to process the multi-region metric space vector using the perspicacity model 355.

In various embodiments, the perspicacity model 355 is configured to process the multi-region metric space vector and, based thereon, assign and/or determine one or more smart bins or fuzzy clusters for which the product is a member. For example, perspicacity model 355 is trained to define a plurality of smart bins and/or fuzzy clusters and to determine a confidence measure indicating the likelihood that a product represented by a multi-region metric space vector is a member of one or more of the plurality of smart bins and/or fuzzy clusters. For example, the plurality of smart bins and/or fuzzy clusters may enable the perspicacity model 355 to predict the projection of the multi-region metric space vector for the product in one region based on the projection(s) of the multi-region metric space vector for the product in one or more other regions of the multi-region metric space.

In an example embodiment, the perspicacity model 355 is provided with the first region portion and the second region portion of a multi-region metric space vector and the perspicacity model 355 generates and/or predicts the third region portion of the multi-region space vector for the product based on the assignment of the product to one or more smart bins and/or fuzzy clusters as a result of the processing of the first region portion and the second region portion of a multi-region metric space vector by the perspicacity model 355. For example, the perspicacity model 355 may determine what the third region portion of the multi-region metric space vector for the product is likely to be based on the trained relationships between components of the first and second region portions of the multi-region metric space vector and the third region portion of the multi-region space vector. As should be understood, in various embodiments, the perspicacity model 355 may be configured to predict first portion region and/or the second portion region of the multi-region metric space vector based at least in part on the third portion region of the multi-region metric space vector, in various embodiments.

For example, in an example embodiment, the perspicacity engine 350 (e.g., being executed by the processing element 305 of the computing entity 130) causes the perspicacity model 355 to transform respective inputs (e.g., at least a portion of a multi-region metric space vector) into respective outputs (e.g., respective fuzzy cluster assignments, respective likelihoods that the product is a member of respective fuzzy clusters, and/or the like). For example, the perspicacity engine may provide at least a portion of a multi-region metric space vector to the input layer of the perspicacity model.

The perspicacity model transforms the received input based at least in part on the learned parameters and/or weights of the perspicacity model and architecture of the perspicacity model. For example, the perspicacity model transforms the at least a portion of the multi-region metric space vector received at the input layer via application of the perspicacity model parameters and/or weights as the data flows from the input layer through the hidden layers of the perspicacity model to the output layer of the perspicacity model. the perspicacity engine then receives the output (e.g., respective fuzzy cluster assignments, respective likelihoods that the product is a member of respective fuzzy clusters, and/or the like) from the output layer of the perspicacity model.

At step/operation 508, the computing entity 130 executes the perspicacity engine 350 to determine at least one parameter corresponding to the product based at least in part on the one or more smart bins and/or fuzzy clusters to which the product was assigned. For example, the computing entity 130 comprises means, such as processing element 305, memory 310, 315, and/or the like, for determining at least one parameter corresponding to the product based at least in part on the one or more smart bins and/or fuzzy clusters to which the product was assigned.

In various embodiments, the at least one parameter corresponding to the product comprises a confidence of the product's ability to perform a usage task or to perform within a usage environment with at least a particular level of performance quality. For example, the at least one parameter may indicate a first confidence that the product is able to perform a first usage task with a particular performance level and a second confidence that the product is able to perform a second usage task with the particular performance level. In another example, the at least one parameter may correspond to the product being able to perform and/or to perform a one or more usage tasks in a particular usage environment with at least a particular level of performance quality. For example, the at least one parameter may indicate a confidence of 95% that the product is able to perform gaming tasks to at least the particular performance level, 87% that the product is able to perform medical device tasks to at least the particular performance level, 62% that the product is able to perform data center tasks to at least the particular performance level, and 73% that the product is able to perform automotive tasks to at least the particular performance level. For example, in an example embodiment, the at least one parameter is a confidence level that a product can perform to a particular level of performance quality for one or more usage tasks and/or in one or more usage environments.

In an example embodiment, the at least one parameter is a distinguishing characteristic between the product and another product or group of products. For example, the at least one parameter may identify a distinguishing characteristic or group of characteristics that causes the product to be assigned to a different smart bin or fuzzy cluster than similar products. For example, a first product may be determined to be similar to a second product because the first region distance between the first multi-region metric space vector and the second multi-region metric space vector is less than the first region threshold and/or the second region distance between the first multi-region metric space vector and the second multi-region metric space vector is less than the second region threshold.

As should be understood, the first region distance between the first product and the second product is the distance (e.g., cosine distance or other metric of distance/similarity, possibly another metric of distance/similarity that is a function of the cosine similarity) between the first region projection of the multi-region metric space vector for the first product and the first region projection of the multi-region metric space vector for the second product. The second region distance between the first product and the second product is the distance (e.g., cosine distance or other metric of distance/similarity, possibly another metric of distance/similarity that is a function of the cosine similarity) between the second region projection of the multi-region metric space vector for the first product and the second region projection of the multi-region metric space vector for the second product.

When two products are determined to be similar, but are assigned to (statistically) different smart bins and/or fuzzy clusters, at least one parameter may be determined that identifies a distinguishing characteristic or group of characteristics that are responsible for the two product being not having similar performance characteristics (e.g., the third region distance between the multi-region metric space vector for the first product and multi-region metric space vector for the second product being greater than a third region threshold). The third region distance between the first product and the second product is the distance (e.g., cosine distance or other metric of distance/similarity, possibly another metric of distance/similarity that is a function of the cosine similarity) between the third region projection of the multi-region metric space vector for the first product and the third region projection of the multi-region metric space vector for the second product.

At step/operation 510, the computing entity 130 provides at least one parameter and/or a representation thereof. For example, the computing entity 130 comprises means, such as processing element 305, memory 310, 315, network interface 320, and/or the like for providing the at least one parameter and/or a representation thereof. For example, the perspicacity engine 350 may provide the at least one parameter and/or a representation thereof, possibly in association with information identifying the product and/or at least a portion of the multi-region metric space vector for the product, via an API response (e.g., in response to the API call that provided the product information to the perspicacity engine 350) and/or an API call.

In an example embodiment, the computing entity 130 provides (e.g., transmits) the at least one parameter and/or a visual and/or audible representation thereof in association with information identifying the product. A computing apparatus 140 configured for user interaction receives the at least one parameter and/or a visual and/or audible representation thereof and information identifying the product and, responsive to receiving or processing the at least one parameter and/or a visual and/or audible representation thereof and information identifying the product, provides the visual and/or audible representation of the at least one parameter in a human perceivable manner. For example, the visual and/or audible representation may be provided via an output element of user interface (e.g., display 416, speaker(s)) of the computing apparatus 140. For example, the computing entity 130 may cause a visual representation of the at least one parameter to be displayed via display 416 of the computing apparatus 140 and/or may cause an audible representation of the at least one parameter to be audibly provided via speakers functionally coupled to the computing apparatus 140.

In an example embodiment, the computing entity 130 stores the at least one parameter to memory 310, 315, such that a machine-readable representation of the at least one parameter (possibly in association with information identifying the product and/or at least a portion of the multi-region metric space vector for the product) is provided as input (now or at a future time) to an application or program being operated by the processing element 305 and/or by a computing apparatus 140. For example, a machine-readable representation of the at least one parameter and the multi-region metric space vector for the product may be provided as input to a product design application and/or program.

In various embodiments, the at least one parameter and/or a representation there of is provided. In various embodiments, the at least one parameter and/or representation is provided along with information identifying the product, at least a portion of the multi-region metric space vector for the product, and/or information corresponding to how the at least one parameter was determined. For example, one or more images from a visual inspection of the product may be provided (e.g., displayed via display 416). The images may include markings identifying one or more areas of note in the image(s). For example, gradient-weighted class activation mapping (Grad-CAM) methods may be used to highlight pixels of the images that provided greater or lesser contributions to the assignment of the product to one or more smart bins and/or fuzzy clusters and/or the determination of the at least one parameter. In another example, the results of one or more functional tests may be provided.

In an example embodiment, the perspicacity model 355 includes a self-attention mechanism that provides information regarding how the assignment of the product to the one or more smart bins and/or fuzzy clusters was determined and/or how the at least one parameter was determined based on the assignment of the product to the one or more smart bins and/or fuzzy clusters. For example, an example product includes five components and the PERSPICACITY model 355 may be trained to identify that products that include a particular component of those five components tend to perform in a particular way. Therefore, the PERSPICACITY model 355 may primarily rely on the including the particular component when determining the expected performance of the product, for example. The information identifying that particular component and its role in the expected performance determination may be provided along with the at least one parameter and/or the representation thereof.

In various embodiments, the perspicacity engine 350 comprises a reverse image search engine and/or a natural language processing (NLP)-based text generator configured to generate at least a portion of the representation of the at least one parameter. For example, the reverse image search engine is configured to identify products for which images from a visual inspection of the product are similar, in an example embodiment. The NLP-based text generator is configured to generate text that describes and/or indicates why and/or how a first image is similar to an image of the product. The representation of the at least one parameter may then include one or more images for products that are similar to the product (e.g., had similar visual inspection results) with important portions of the one or more images highlighted and the generated text that describes and/or indicates why and/or how the one or more images relate to the product and/or the at least one parameter determined for the product.

In various embodiments, the representation of the at least one parameter is provided via a dashboard displayed via display 416. The dashboard provides the at least one parameter as a connected graph. For example, the dashboard may include a statement of the at least one parameter (possibly generate using the NLP-based text generator) and an image of the product (e.g., captured as part of a visual inspection process) with important areas of the image highlighted. A user may interact with the dashboard to select an important area of the image and be provided with marked images of other similar products that illustrate similar features and text generated by the NLP-based text generator that describes and/or indicates the similarities between the images and/or image features. In various embodiments, the dashboard may use various cluster visualization methods, such as t-distributed stochastic neighbor embedding (TSNE), principal component analysis (PCA), approximate nearest neighbors, approximate nearest neighbors oh yeah (ANNOY), Nutanix Guest Tools (NGT), FAISS, and/or other cluster visualization tools and/or methods, to generate and/or provide the representation of the at least one parameter. For example, a connected graph may be used to illustrate and/or visually indicate the connections determined/identified by the perspicacity model 355 between different aspects of the product.

In various embodiments, the perspicacity model 355 and/or one or more portions of the perspicacity engine 350 are trained using machine learning. For example, in an example embodiment, the perspicacity model 355 is a deep neural network (DNN), such as a Siamese network, for example. In an example embodiment, the perspicacity model 355 is a Siamese network trained using a triplet loss with margin alpha loss function.

In various embodiments, the perspicacity model 355 is an actively trained self-learning model. For example, the perspicacity model 355 is trained to learn one or more smart bins and/or fuzzy clusters based on processing of training data. For example, the one or more smart bins and/or fuzzy clusters are determined and/or defined by the perspicacity model 355 rather than user input, in various embodiments.

In various embodiments, the perspicacity model 355 is trained using a semi-supervised machine learning algorithm. For example, the perspicacity model 355 may be trained, at least in part, using a first data set that is labeled and/or includes human annotations. The perspicacity model 355 may then be further trained using second, third, and/or additional data sets that include pseudo-labels that are generated by the perspicacity engine 350 (e.g., based at least in part on results generated by the perspicacity model 355).

In various embodiments, the perspicacity model 355 is used as part of the perspicacity engine 350 to process multi-region metric space vectors corresponding to products and determine respective parameters based on respective smart bin and/or fuzzy cluster assignments once the perspicacity model 355 is at least partially trained. Training of the perspicacity model 355 may then continue based on incoming product information as such information is obtained and/or becomes available. For example, when performance logs are obtained and/or become available for a product (e.g., from in field testing, for example), the first and second region portions of the multi-region metric space vector for the product may be accessed from memory 310, 315, and the third region portion of the multi-region metric space vector may be generated and/or defined. The perspicacity model 355 may then be trained using the full multi-region metric space vector for the product along with any automatically determined pseudo-labels thereof.

Example Active Training of a Perspicacity Engine

In various embodiments, a perspicacity engine 350 and/or a perspicacity model 355 of a perspicacity engine 350 is trained using a machine learning technique. In various embodiments, the perspicacity model 355 comprises a deep neural network. For example, in an example embodiment, the perspicacity model 355 comprises a Siamese network. In an example embodiment, the perspicacity model 355 comprises a Siamese network that is trained using a triplet loss with margin alpha loss function. In various embodiments, the perspicacity model 355 is an actively trained model. For example, in various embodiments, the perspicacity model 355 is self-learning model. For example, in various embodiments, the perspicacity model is a trained using a semi-supervised machine learning algorithm.

FIG. 6 provides a flowchart illustrating various processes, procedures, operations, and/or the like for training a perspicacity model 355. Staring at step/operation 602, the computing entity 130 generates an initial neural network (INN) having a particular network architecture and initial weights and/or parameters. For example, the computing entity 130 comprises means, such as processing element 305, memory 310, 315, and/or the like, for performing an initial training of the perspicacity model using a first set of data.

In various embodiments, the INN is trained to form the at least partially trained perspicacity model using training data. In various embodiments, a first set of data is used as part of the training data. In various embodiments, the first set of data comprises labels. The labels comprise human annotations, human provided performance information, automatically determined and/or generated product performance logs, and/or the like. In an example embodiment, the label(s) corresponding to a product are provided as the third region portion of the multi-region metric space vector for the product.

A machine learning algorithm is then performed on the INN to generate an at least partially trained perspicacity model 355. In an example embodiment, the at least partially trained perspicacity model 355 is defined by the particular network architecture. The at least partially trained perspicacity model 355 is further defined by weights and/or parameters that have been learned through the performance of the machine learning algorithm.

In various embodiments, the machine learning algorithm uses training data to perform the training of the perspicacity model 355. For example, the perspicacity model 355 may evaluate and/or process an instance of training data to generate a corresponding prediction. A loss function is used to evaluate the predictions made by the perspicacity model 355 and determine adjustments to be made to the weights and/or parameters, such that the perspicacity model learns the values of the weights and/or parameters through the training.

For example, a predicted third region portion of the multi-region metric space vector for the product may be generated by the perspicacity model based on the first and second region portions of the multi-region metric space vector for the product. The predicted third region portion may then be compared to the third region portion indicated by the first set of data. For example, a similarity metric may be determined to determine how similar the predicted third region portion is from the third region portion indicated by the first set of data. For example, the similarity metric may be a cosine similarity, cosine distance, another function of the cosine similarity, Euclidean distance within the third region of the multi-region metric space, and/or the like. In various embodiments, the loss function is evaluated based on similarity metrics determined for a plurality of instances of training data included in the first set of data. The weights and/or parameters are then adjusted based on the loss function to provide the at least partially trained perspicacity model.

At step/operation 604, the computing entity 130 obtains a second set of data. For example, the computing entity 130 comprises means, such as processing element 305, memory 310, 315, network interface 320, and/or the like, for obtaining a second set of data. In various embodiments, the second set of data is obtained by accessing the second set of data from memory 310, 315, receiving elements and/or instances of the second set of data from one or more computing apparatuses 140, and/or the like. In various embodiments, the second set of data comprises one or more instances of training data that do not include labels. For example, in various embodiments, at least one instance of training data of the second set of data comprises supply chain and component information for use in generating, determining, and/or defining a first region portion of a multi-region metric space vector for a corresponding product and/or assembly and fabrication information for use in generating, determining, and/or defining a second region portion of the multi-region metric space vector for the corresponding product, but does not include usage and usage environment information for use in generating, determining, and/or defining a third region portion of the multi-region metric space vector for the corresponding product.

At step/operation 606, the computing entity 130 operates the perspicacity engine 350 to use the perspicacity model 355 to generate pseudo-labels for the second set of data. For example, the computing entity 130 comprises means, such as processing element 305, memory 310, 315, and/or the like, for generating pseudo-labels for the second set of data. In general, pseudo-labeling is the process of using a model trained using labelled data to predict labels (referred to as pseudo-labels) for unlabeled data such that the labelled data and pseudo-labeled data can then be combined to further train the model.

For example, the perspicacity model 355 is used to process instances of the second set of data and generate appropriate pseudo-labels (e.g., predicted labels) for the instances of the second set of data. For example, an instance of the second set of data corresponding to a product comprises supply chain and component information for use in generating, determining, and/or defining a first region portion of a multi-region metric space vector for the product and assembly and fabrication information for use in generating, determining, and/or defining a second region portion of the multi-region metric space vector for the product, but does not include usage and usage environment information for use in generating, determining, and/or defining a third region portion of the multi-region metric space vector for the product. Thus, the perspicacity engine 350 generates, determines, and/or defines a partial multi-region metric space vector (e.g., including the first region portion and the second region portion, but not the third region portion, for example) for the product and passes and/or provides the partial multi-region metric space vector to the perspicacity model 355. The perspicacity model 355 generates a pseudo-labels for the instance of the second set of data by generating a predicted third region portion to complete the multi-region metric space vector.

At step/operation 608, the computing entity 130 executes the perspicacity engine 350 to cause the perspicacity model 355 to be trained using a combination of the first set of data that includes labels and the second set of data that includes pseudo-labels. For example, the computing entity 130 comprises means, such as processing element 305, memory 310, 315, and/or the like, for training the perspicacity model 355 using a combination of the first set of data that includes labels and the second set of data that includes pseudo-labels. The perspicacity model 355 may then be used and/or continue to be used to process at least partial multi-region metric space vectors (e.g., multi-region metric space vectors that include one or two region portions but do not include sufficient information to be a complete multi-region metric space vector including all three region portions. For example, the perspicacity model 355 may be used and/or continue to be used to process at least partial multi-region metric space vectors and determining one or more fuzzy cluster assignments for the corresponding products based at least in part on the respective at least partial multi-region metric space vector.

In various embodiments, the active training of the perspicacity model 355 is continued. For example, as more sets of data become available, further training may be performed. The further sets of data may include instances of training data that include labels and/or may include instances of training data that do not include labels. For example, at step/operation 610, the computing entity 130 obtains a third set of data. For example, the computing entity 130 comprises means, such as processing element 305, memory 310, 315, network interface 320, and/or the like, for obtaining a third set of data. In various embodiments, the third set of data is obtained by accessing the third set of data from memory 310, 315, receiving elements and/or instances of the third set of data from one or more computing apparatuses 140, and/or the like.

In various embodiments, the third set of data comprises one or more instances of training data that do not include labels. For example, in various embodiments, at least one instance of training data of the third set of data comprises supply chain and component information for use in generating, determining, and/or defining a first region portion of a multi-region metric space vector for a corresponding product and/or assembly and fabrication information for use in generating, determining, and/or defining a second region portion of the multi-region metric space vector for the corresponding product, but does not include usage and usage environment information for use in generating, determining, and/or defining a third region portion of the multi-region metric space vector for the corresponding product. In an example embodiment, the third set of data comprises one or more instances of training data that do include labels.

At step/operation 612, the computing entity 130 operates the perspicacity engine 350 to use the perspicacity model 355 to generate pseudo-labels for the third set of data. For example, the computing entity 130 comprises means, such as processing element 305, memory 310, 315, and/or the like, for generating pseudo-labels for the third set of data.

For example, the perspicacity model 355 is used to process instances of the third set of data and generate appropriate pseudo-labels (e.g., predicted labels) for the instances of the third set of data. For example, an instance of the third set of data corresponding to a product comprises supply chain and component information for use in generating, determining, and/or defining a first region portion of a multi-region metric space vector for the product and assembly and fabrication information for use in generating, determining, and/or defining a second region portion of the multi-region metric space vector for the product, but does not include usage and usage environment information for use in generating, determining, and/or defining a third region portion of the multi-region metric space vector for the product. Thus, the perspicacity engine 350 generates, determines, and/or defines a partial multi-region metric space vector (e.g., including the first region portion and the second region portion, but not the third region portion, for example) for the product and passes and/or provides the partial multi-region metric space vector to the perspicacity model 355. The perspicacity model 355 generates a pseudo-labels for the instance of the third set of data by generating a predicted third region portion to complete the multi-region metric space vector.

At step/operation 614, the computing entity 130 executes the perspicacity engine 350 to cause the perspicacity model 355 to be trained using the third set of data that includes pseudo-labels, possibly in combination with the first set of data that includes labels and/or the second set of data that includes pseudo-labels. For example, the computing entity 130 comprises means, such as processing element 305, memory 310, 315, and/or the like, for training the perspicacity model 355 using the third set of data that includes pseudo-labels, possibly in combination with the first set of data that includes labels and/or the second set of data that includes pseudo-labels. The perspicacity model 355 may then be used and/or continue to be used to process at least partial multi-region metric space vectors (e.g., multi-region metric space vectors that include one or two region portions but do not include sufficient information to be a complete multi-region metric space vector including all three region portions. For example, the perspicacity model 355 may be used and/or continue to be used to process at least partial multi-region metric space vectors and determining one or more fuzzy cluster assignments for the corresponding products based at least in part on the respective at least partial multi-region metric space vector.

As described herein, the multi-region metric space includes three distinct regions. However, in various embodiments, the multi-region metric space may include two regions or more than three regions (e.g., four regions, five regions, and/or the like).

V. Other Example Embodiments

While example embodiments are provided herein regarding a perspicacity model for providing perspicacity regarding various aspects of a product, in various embodiments a perspicacity model is provided that provides perspicacity and/or insight to connections and/or relationships between at least first aspect and a second aspect of an item. In various embodiments, the perspicacity model may be configured to provide perspicacity between two or more aspects of an item (e.g., three or four aspects). In the above described example, the item is a product and the two or more aspects correspond to the supply chain and component information, assembly and fabrication information, and usage and usage environment information, respectively.

For example, in an example embodiment, item information corresponding to an item is received and/or accessed by a computing entity 130. The computing entity 130 then defines a multi-region metric space vector based at least in part on the item information. The multi-region metric space vector is a vector within multi-region metric space. The multi-region metric space comprises at least a first region corresponding to a first portion of the item information regarding a first aspect of the item and a second region corresponding to a second portion of the item information regarding a second aspect of the item. Both the first region and the second region of the multi-region vector space are multi-dimensional regions. In an example embodiment, the multi-region space vector is incomplete. For example, values for each of the dimensions of the first region may be defined in the multi-region space vector, but values may not be defined for each of the dimensions of the second region.

A perspicacity model is at least partially trained (e.g., using a machine learning algorithm) to process multi-region metric space vectors to provide perspicacity and/or insight regarding connections and/or relationships between the first aspect of the item and the second aspect of the item. For example, the perspicacity model is configured and/or trained define fuzzy clusters within the multi-region metric space. For example, the perspicacity model may be trained to determine and/or predict the projection of the multi-region metric space vector in the second region based on the projection of the multi-region metric space vector in the first region, or vice versa. In an example embodiment, the perspicacity model is trained to determine and/or predict the projection of the multi-region metric space vector in an ith region based on the projection of the multi-region metric space vector in one or more other regions of the multi-region space vector.

In various embodiments, the computing entity 130 causes the multi-region metric space vector to be processed by the at least partially trained perspicacity model. For example, the perspicacity model may assign the item to one or more fuzzy clusters within the multi-region metric space based on the multi-region metric space vector defined for the item. For example, the one or more fuzzy clusters to which an item is assigned may indicate the prediction of the projection of the multi-region space vector for the item in the second region determined based on the projection of the multi-region space vector for the item in the first region.

In various embodiments, the computing entity 130 determines at least one parameter corresponding to the item based at least in part on at least one fuzzy cluster to which the perspicacity model assigned the multi-region space vector. The computing entity 130 then provides or causes providing of (a) a visual or audible representation of the at least one parameter or (b) a machine-readable representation of the at least one parameter as input to an application or program being operated on one or more processors.

In an example embodiment, the computing entity 130 provides (e.g., transmits) the at least one parameter and/or a visual and/or audible representation thereof in association with information identifying the item. A computing apparatus 140 configured for user interaction receives the at least one parameter and/or a visual and/or audible representation thereof and information identifying the item and, responsive to receiving or processing the at least one parameter and/or a visual and/or audible representation thereof and information identifying the item, provides the visual and/or audible representation of the at least one parameter in a human perceivable manner. For example, the visual and/or audible representation may be provided via an output element of user interface (e.g., display 416, speaker(s)) of the computing apparatus 140. For example, the computing entity 130 may cause a visual representation of the at least one parameter to be displayed via display 416 of the computing apparatus 140 and/or may cause an audible representation of the at least one parameter to be audibly provided via speakers functionally coupled to the computing apparatus 140.

In an example embodiment, the computing entity 130 stores the at least one parameter to memory 310, 315, such that a machine-readable representation of the at least one parameter (possibly in association with information identifying the item and/or at least a portion of the multi-region metric space vector for the item) is provided as input (now or at a future time) to an application or program being operated by the processing element 305 and/or by a computing apparatus 140. For example, a machine-readable representation of the at least one parameter and the multi-region metric space vector for the item may be provided as input to an item design application and/or program.

For example, the item may be patient results. The aspects corresponding to the item may include the care team (e.g., attending physicians, facilities where the patient received treatment, and/or the like) treating the patient; medications, procedures, and/or treatments used to treat the patient; patient health history, and/or the like. In such an example, (e.g., where privacy is important) federated learning (FL) based model training and/or encrypted data model training (e.g., training of the data using at least partially encrypted data) may be used. Insight regarding connections between various aspects of various other items may be achieved in various embodiments.

VI. Technical Advantages

Conventionally, various types of products are tested before being packaged and shipped for use. Such testing is conventionally performed in a pass or fail manner. However, a product that nominally passes a particular test may be able to perform to a particular level of performance quality for first usages and/or in a first usage environment, but not be able to perform to the particular level of performance quality for second usages and/or in a second usage environment. Thus, when the product is provided for the second usages and/or for use in the second usage environment, the product may be found to fail, despite having passed the particular test. However, information regarding the performance of products for performing particular usage tasks and/or in particular usage environments may be difficult to obtain and/or not available for a substantial number of products.

This lack of insight results in product failures that can have significant consequences. For example, the product may be a computer chip that, based on conventional testing, is expected to be a functional computer chip and is then incorporated into a data center. However, despite passing the conventional test, the computer chip may not be suited for performing well under the particular processing requirements of the data center and/or environmental conditions of the data center. The computer chip may then fail, causing significant down time for the data center and disruption of services due to technical failures. For example, on paper the computer chip may appear to be an appropriate computer chip for use in the data center. However, due to various supply chain and/or assembly and/or fabrication factors, the computer chip may not be able to perform at a particular level of performance quality for some usages and/or in particular usage environments. Therefore, technical problems exist as to how to determine which products will perform at acceptable performance levels for various usages and/or in various usage environments and how to determine at a design stage of a product, for example, whether the product will perform to a particular level of performance quality for a particular usage and/or in a particular usage environment.

Various embodiments provide technical solutions to these technical problems. For example, various embodiments provide perspicacity and/or insight regarding how supply chain factors and/or assembly and/or fabrication factors affect resulting products in ways that may not be apparent from product specification data. Through the tracking and processing of how products perform for various usages and/or in various usage environments and linking the usage and usage environment information with supply chain and component information and assembly and/or fabrication information appropriate usages and/or usage environments may be determined for existing products and/or products may be designed for improved performance in particular usages and/or usage environments. Thus, performance of products is improved by identifying the usages and usage environments in which the products are best suited and identifying the usages and usage environments in which the products are likely to fail. For example, various embodiments enable the prevention of product failures caused by a product being used in a usage or usage environment for which the product is nominally suited, but due to various factors, is not well suited. For example, various embodiments provide traceability for products. Moreover, the product traceability provided enables and/or includes reliability prediction. Therefore, various embodiments provide technical improvements.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method performed by a computing entity, the method comprising:

obtaining product information corresponding to a product;

defining a multi-region metric space vector based at least in part on the product information, wherein the multi-region metric space vector is a vector within a multi-region metric space, the multi-region metric space comprising a first region corresponding to supply chain and component information, a second region corresponding to assembly and fabrication information, and a third region corresponding to usage and usage environment information, at least the first region, second region, and third region of the multi-region metric space each being multi-dimensional regions;

processing the multi-region metric space vector using an at least partially trained perspicacity model configured to define fuzzy clusters within the multi-region metric space;

determining at least one parameter corresponding to the product based at least in part on at least one fuzzy cluster to which the perspicacity model assigned the multi-region metric space vector; and providing or causing providing of (a) a visual or audible representation of the at least one parameter or (b) a machine-readable representation of the at least one parameter as input to an application or program being operated on one or more processors.

2. The method of claim 1, wherein the perspicacity model is trained using a combination of labeled data and pseudo-labeled data.

3. The method of claim 1, wherein the perspicacity model comprises a Siamese neural network.

4. The method of claim 1, wherein the at least one parameter corresponding to the product comprises a confidence an ability of the product to perform a usage task or to perform within a usage environment with at least a particular level of performance quality.

5. The method of claim 1, wherein the product information comprises component information, wherein the component information (a) comprises at least one of identification of at least one component of the product, identification of a source of the at least one component of the product, a test result corresponding to the at least one component of the product, a quality of the at least one component, or a characteristic of the at least one component and (b) is used to define a portion of the multi-region metric space vector corresponding to the first region.

6. The method of claim 1, wherein the product information comprises assembly information, wherein the assembly information (a) comprises at least one of identification of a machine or process used to fabricate the product, parameters of the machine or process used to fabricate the product, results of one or more functional or visual tests performed during fabrication of the product, or environment characteristics during fabrication of the product, and (b) is used to define a portion of the multi-region metric space vector corresponding to the second region.

7. The method of claim 1, wherein the product information comprises usage information, wherein the usage information (a) comprises at least one of (i) performance quality of one or more usage tasks performed by or with the product or (ii) usage environment data characterizing an environment in which the product is used and (b) is used to define a portion of the multi-region metric space vector corresponding to the third region.

8. The method of claim 7, wherein at least a portion of the usage information is captured during usage of the product in a usage environment.

9. The method of claim 1, wherein training the perspicacity model comprises:

training an initial neural network based on a first set of data, the first set of data comprising human annotated labels to generate a partially trained perspicacity model;

obtaining a second set of data;

generating pseudo-labels for the second set of data based at least in part on the partially trained perspicacity model; and training the partially trained perspicacity model based on the second set of data and the pseudo-labels for the second set of data.

10. The method of claim 9, further comprising:

obtaining a third set of data;

generating pseudo-labels for the third set of data based at least in part on the partially trained perspicacity model; and further training the partially trained perspicacity model based on the third set of data and the pseudo-labels for the third set of data.

11. The method of claim 1, wherein the at least one parameter is a distinguishing characteristic between the product and at least one other product.

12. The method of claim 1, wherein the perspicacity model is an actively trained model.

13. An apparatus comprising at least one processor and at least one memory including computer program code, the at least one memory and the computer program code configured to, with the at least one processor, cause the apparatus to at least:

obtain product information corresponding to a product;

define a multi-region metric space vector based at least in part on the product information, wherein the multi-region metric space vector is a vector within a multi-region metric space, the multi-region metric space comprising a first region corresponding to supply chain and component information, a second region corresponding to assembly and fabrication information, and a third region corresponding to usage and usage environment information, at least the first region, second region, and third region of the multi-region metric space each being multi-dimensional regions;

process the multi-region metric space vector using an at least partially trained perspicacity model configured to define fuzzy clusters within the multi-region metric space;

determine at least one parameter corresponding to the product based at least in part on at least one fuzzy cluster to which the perspicacity model assigned the multi-region metric space vector; and provide or cause providing of (a) a visual or audible representation of the at least one parameter or (b) a machine-readable representation of the at least one parameter as input to an application or program being operated on one or more processors.

14. The apparatus of claim 13, wherein the perspicacity model is trained using a combination of labeled data and pseudo-labeled data.

15. The apparatus of claim 13, wherein the at least one parameter corresponding to the product comprises a confidence of an ability of the product to perform a usage task or to perform within a usage environment with at least a particular level of performance quality.

16. The apparatus of claim 13, wherein the product information comprises component information, wherein the component information (a) comprises at least one of identification of at least one component of the product, identification of a source of the at least one component of the product, a test result corresponding to the at least one component of the product, a quality of the at least one component, or a characteristic of the at least one component and (b) is used to define a portion of the multi-region metric space vector corresponding to the first region.

17. The apparatus of claim 13, wherein the product information comprises assembly information, wherein the assembly information (a) comprises at least one of identification of a machine or process used to fabricate the product, parameters of the machine or process used to fabricate the product, results of one or more functional or visual tests performed during fabrication of the product, or environment characteristics during fabrication of the product, and (b) is used to define a portion of the multi-region metric space vector corresponding to the second region.

18. The apparatus of claim 13, wherein the product information comprises usage information, wherein the usage information (a) comprises at least one of (i) performance quality of one or more usage tasks performed by or with the product or (ii) usage environment data characterizing an environment in which the product is used and (b) is used to define a portion of the multi-region metric space vector corresponding to the third region.

19. The apparatus of claim 13, wherein the perspicacity model is an actively trained model.

20. A method performed by a computing entity, the method comprising:

obtaining item information corresponding to an item;

defining a multi-region metric space vector based at least in part on the item information, wherein the multi-region metric space vector is a vector within a multi-region metric space, the multi-region metric space comprising at least a first region corresponding to a first portion of the item information corresponding to a first aspect of the item and a second region corresponding to a second portion of the item information corresponding to a second aspect of the item, at least the first region and the second region of the multi-region metric space each being multi-dimensional regions;

processing the multi-region metric space vector using an at least partially trained perspicacity model configured to define fuzzy clusters within the multi-region metric space;

determining at least one parameter corresponding to the item based at least in part on at least one fuzzy cluster to which the perspicacity model assigned the multi-region metric space vector; and providing or causing providing of (a) a visual or audible representation of the at least one parameter or (b) a machine-readable representation of the at least one parameter as input to an application or program being operated on one or more processors.

\*  \*  \*  \*  \*